United States Patent
Lane et al.

(10) Patent No.: US 12,492,949 B2
(45) Date of Patent: Dec. 9, 2025

(54) IR THERMOMETRY PROBE COVER

(71) Applicant: Welch Allyn, Inc., Skaneateles Falls, NY (US)

(72) Inventors: John A. Lane, Venice, FL (US); David E. Quinn, Auburn, NY (US); Ray D. Stone, Camillus, NY (US); Scott A. Martin, Camillus, NY (US); John R. Strom, Jersey City, NJ (US)

(73) Assignee: Welch Allyn, Inc., Skaneateles Falls, NY (US)

(*) Notice: Subject to any disclaimer, the term of this patent is extended or adjusted under 35 U.S.C. 154(b) by 38 days.

(21) Appl. No.: 18/141,547

(22) Filed: May 1, 2023

(65) Prior Publication Data
US 2023/0266178 A1 Aug. 24, 2023

Related U.S. Application Data

(63) Continuation of application No. 17/085,527, filed on Oct. 30, 2020, now Pat. No. 11,656,133, which is a
(Continued)

(51) Int. Cl.
*G01K 13/25* (2021.01)
*G01J 5/00* (2022.01)
*G01J 5/02* (2022.01)

(52) U.S. Cl.
CPC .......... *G01K 13/252* (2021.01); *G01J 5/0011* (2013.01); *G01J 5/021* (2013.01); *Y10T 29/49* (2015.01)

(58) Field of Classification Search
CPC .... G01K 13/252; G01K 13/25; G01K 13/223; G01K 13/20; G01J 5/0011; G01J 5/021; Y10T 29/49
(Continued)

(56) References Cited

U.S. PATENT DOCUMENTS 3,110,304 A 11/1963 Hartman
3,889,661 A 6/1975 Fiore
(Continued)

FOREIGN PATENT DOCUMENTS

CN 1263621 8/2000
DE 29901394 6/1999
(Continued)

OTHER PUBLICATIONS

U.S. Appl. No. 18/141,547, filed Jul. 23, 2024_WO_2010078219_A1_H.pdf,Jul. 8, 2010.*
(Continued)

*Primary Examiner* — Peter J Macchiarolo
(74) *Attorney, Agent, or Firm* — Lee & Hayes, P.C.

(57) ABSTRACT

A protective cover for an insertion probe of a medical instrument. The cover contains a flexible tubular body that compliments the probe geometry and a radially disposed flange that surrounds the proximal end of the body. A series of snap-on fasteners removably connect the cover to the instrument. A camming surface is located on the outer face of the flange which coacts with a cam follower that is movably mounted upon the instrument to flex the cover sufficiently to open the fastener and release the cover from the instrument and move the cover axially toward the distal end of the tip.

24 Claims, 15 Drawing Sheets

Related U.S. Application Data continuation of application No. 16/251,774, filed on Jan. 18, 2019, now Pat. No. 10,823,621, which is a continuation of application No. 15/784,791, filed on Oct. 16, 2017, now Pat. No. 10,184,842, which is a continuation of application No. 14/511,986, filed on Oct. 10, 2014, now Pat. No. 9,791,326, which is a continuation of application No. 13/196,700, filed on Aug. 2, 2011, now Pat. No. 8,876,373, which is a continuation-in-part of application No. 12/420,926, filed on Apr. 9, 2009, now Pat. No. 8,231,271.

(58) Field of Classification Search
USPC .................................. 374/158, 209, 121
See application file for complete search history.

(56) References Cited

U.S. PATENT DOCUMENTS

| | | | |
|---|---|---|---|
| 3,929,018 A | 12/1975 | Turner | |
| 3,987,899 A | 10/1976 | Vyprachticky | |
| 4,380,998 A | 4/1983 | Kieffer, III et al. | |
| 4,662,360 A | 5/1987 | O'Hara et al. | |
| 4,784,149 A | 11/1988 | Berman et al. | |
| 4,863,281 A | 9/1989 | Suszynski | |
| 5,066,142 A | 11/1991 | DeFrank et al. | |
| 5,088,834 A | 2/1992 | Howe et al. | |
| 5,163,418 A | 11/1992 | Fraden et al. | |
| 5,176,630 A | 1/1993 | Shilling et al. | |
| 5,293,862 A | 3/1994 | O'Hara et al. | |
| 5,390,663 A | 2/1995 | Schaefer | |
| 5,403,286 A | 4/1995 | Lockwood, Jr. | |
| 5,411,032 A | 5/1995 | Esseff et al. | |
| 5,516,010 A | 5/1996 | O'Hara et al. | |
| 5,588,748 A | 12/1996 | Nomura et al. | |
| 5,645,350 A * | 7/1997 | Jang | G01J 5/06 |
| | | | 374/E1.013 |
| 5,707,343 A | 1/1998 | O'Hara et al. | |
| 5,795,067 A | 8/1998 | Fraden et al. | |
| 5,893,833 A | 4/1999 | Pompei et al. | |
| 5,906,437 A * | 5/1999 | Lin | G01J 5/021 |
| | | | 374/E1.013 |
| 5,968,458 A | 10/1999 | Shaikho | |
| 5,980,451 A | 11/1999 | O'Hara et al. | |
| 6,022,140 A * | 2/2000 | Fraden | G01J 5/02 |
| | | | 374/E1.013 |
| 6,042,266 A | 3/2000 | Cheslock et al. | |
| 6,053,875 A | 4/2000 | Rosenbaum et al. | |
| 6,123,454 A | 9/2000 | Canfield et al. | |
| 6,129,673 A | 10/2000 | Fraden | |
| 6,139,182 A | 10/2000 | Levatter et al. | |
| 6,142,934 A | 11/2000 | Lagerway et al. | |
| 6,152,596 A | 11/2000 | Fraden | |
| 6,155,987 A | 12/2000 | Scherl | |
| 6,224,256 B1 | 5/2001 | Bala | |
| 6,238,088 B1 | 5/2001 | Wu | |
| 6,254,271 B1 | 7/2001 | Lin | |
| 6,332,090 B1 | 12/2001 | DeFrank et al. | |
| 6,347,243 B1 | 2/2002 | Fraden | |
| 6,367,973 B2 | 4/2002 | Yamaka | |
| 6,383,133 B1 | 5/2002 | Jones | |
| 6,390,671 B1 | 5/2002 | Tseng | |
| 6,461,037 B1 | 10/2002 | O'Leary | |
| 6,513,970 B1 | 2/2003 | Tabata et al. | |
| 6,612,735 B2 | 9/2003 | Tomioka et al. | |
| 6,695,474 B2 | 2/2004 | Beerwerth et al. | |
| 6,751,497 B2 | 6/2004 | Fraden | |
| 6,786,636 B1 | 9/2004 | Huang et al. | |
| 6,789,936 B1 | 9/2004 | Kraus et al. | |
| 6,850,789 B2 | 2/2005 | Schweitzer, Jr. et al. | |
| 7,037,083 B2 | 5/2006 | O'Neil et al. | |
| 7,083,330 B1 | 8/2006 | Yao | |
| 7,237,949 B2 | 7/2007 | Lantz et al. | |
| 7,354,194 B2 | 4/2008 | Walker et al. | |
| 7,494,273 B2 | 2/2009 | Huang et al. | |
| 7,520,671 B2 | 4/2009 | Lantz et al. | |
| 7,556,424 B2 | 7/2009 | Walker et al. | |
| 7,572,056 B2 | 8/2009 | Lane et al. | |
| 7,585,108 B2 | 9/2009 | Chuang et al. | |
| 7,686,506 B2 | 3/2010 | Babkes et al. | |
| 7,841,767 B2 | 11/2010 | Harr | |
| 7,927,012 B2 | 4/2011 | Harr et al. | |
| 8,186,876 B2 | 5/2012 | Mullin et al. | |
| 8,517,603 B2 | 8/2013 | Fraden | |
| 8,651,736 B2 * | 2/2014 | Mullin | G01J 5/0011 |
| | | | 374/209 |
| 9,357,930 B2 | 6/2016 | Quinn et al. | |
| D787,683 S | 5/2017 | Martin et al. | |
| 10,928,254 B2 | 2/2021 | Lin et al. | |
| 2001/0014112 A1 | 8/2001 | Yamaka | |
| 2002/0085616 A1 | 7/2002 | Yu | |
| 2002/0163955 A1 | 11/2002 | Yu | |
| 2003/0179809 A1 | 9/2003 | Nakagawa et al. | |
| 2004/0028116 A1 * | 2/2004 | Lin | G01J 5/049 |
| | | | 374/E13.003 |
| 2005/0027168 A1 | 2/2005 | Strom et al. | |
| 2005/0027169 A1 | 2/2005 | Goldfain et al. | |
| 2005/0043588 A1 | 2/2005 | Tsai | |
| 2005/0085733 A1 | 4/2005 | Wong | |
| 2006/0020176 A1 | 1/2006 | Berall | |
| 2006/0120432 A1 | 6/2006 | Lantz et al. | |
| 2006/0165152 A1 | 7/2006 | Walker et al. | |
| 2007/0189358 A1 | 8/2007 | Lane et al. | |
| 2008/0123717 A1 | 5/2008 | Lane et al. | |
| 2008/0203078 A1 | 8/2008 | Huerter | |
| 2009/0116540 A1 | 5/2009 | Weng et al. | |
| 2009/0129437 A1 | 5/2009 | Chuang et al. | |
| 2010/0147719 A1 | 6/2010 | Li | |
| 2010/0260230 A1 * | 10/2010 | Lane | G01J 5/0011 |
| | | | 374/209 |
| 2011/0134962 A1 | 6/2011 | Fraden | |
| 2011/0257521 A1 | 10/2011 | Fraden | |
| 2013/0128926 A1 | 5/2013 | Fraden | |
| 2013/0245488 A1 | 9/2013 | Quinn et al. | |
| 2014/0046192 A1 | 2/2014 | Mullin et al. | |
| 2014/0119406 A1 | 5/2014 | Chen | |
| 2015/0124854 A1 | 5/2015 | Lane et al. | |
| 2018/0100770 A1 | 4/2018 | Lane et al. | |
| 2019/0162601 A1 | 5/2019 | Lane et al. | |
| 2021/0048348 A1 | 2/2021 | Lane et al. | |

FOREIGN PATENT DOCUMENTS

| | | | |
|---|---|---|---|
| EP | 0180368 | 5/1986 | |
| EP | 0472490 | 2/1992 | |
| EP | 1262753 A1 | 12/2002 | |
| EP | 1790962 | 5/2007 | |
| EP | 1857037 A1 | 11/2007 | |
| JP | 2006512965 | 4/2006 | |
| KR | 20140055990 | 5/2014 | |
| TW | 200921064 | 5/2009 | |
| WO | WO9500067 A1 | 1/1995 | |
| WO | WO9719332 A1 | 5/1997 | |
| WO | WO99/042760 A1 | 8/1999 | |
| WO | WO-0018288 A1 * | 4/2000 | ................ G01J 5/02 |
| WO | WO-0052434 A1 * | 9/2000 | ................ G01J 5/02 |
| WO | WO02/056756 A2 | 7/2002 | |
| WO | WO2004063686 A1 | 7/2004 | |
| WO | WO101078219 A1 | 7/2010 | |
| WO | WO-2010078219 A1 * | 7/2010 | ........... A61B 5/0086 |

OTHER PUBLICATIONS

U.S. Appl. No. 18/141,547, filed Jul. 23, 2024_WO_0052434_A1_H.pdf,Sep. 8, 2000.*

U.S. Appl. No. 18/141,547, filed Jul. 23, 2024_WO_0018288_A1_H.pdf,Apr. 6, 2000.*

Anonymous, "FirstTemp Genius Infrared Thermometer," Feb. 2004, Tyco Healthcare, pp. 1-4.

The Australian Office Action mailed Jan. 27, 2015 for Australian patent application No. 2012290134, a counterpart foreign application of U.S. Pat. No. 8,876,373, 5 pages.

(56) References Cited

OTHER PUBLICATIONS

The Australiian Office Action mailed Jun. 18, 2013 for Australian patent application No. 2010234503, a counterpart foreign application of U.S. Pat. No. 8,231,271, 3 pages.
The Canadian Office Action mailed on Feb. 4, 2020 for Canadian Patent Application No. 2,844,092, a counterpart of U.S. Pat. No. 8,876,373, 4 pages.
The Canadian Office Action mailed on Feb. 26, 2019 for Canadian Patent Application No. 2,844,092, a counterpart of U.S. Pat. No. 8,876,373, 3 pages.
The Canadian Office Action mailed Mar. 9, 2016 for Canadian Patent Application No. 2757666, a counterpart foreign application of U.S. Pat. No. 8,231,271, 7 pages.
The Canadian Office Action mailed Apr. 13, 2018 for Canadian Patent Application No. 2844092, a counterpart foreign application of U.S. Pat. No. 8,876,373, 7 pages.
Translated the Chinese Office Action mailed Jan. 13, 2016 for Chinese Patent Application 201280048359.5, a counterpart foreign application of U.S. Pat. No. 8,876,373, 17 pages.
Translated the Chinese Office Action mailed Mar. 6, 2017 for Chinese patent application No. 201280048359.5, a counterpart foreign application of U.S. Pat. No. 8,876,373, 10 pages.
The Chinese Office Action mailed Sep. 11, 2017 for Chinese Patent Application No. 201280048359.5, a counterpart foreign application of U.S. Pat. No. 8,876,373, 3 pages.
Translated the Chinese Office Action mailed Aug. 25, 2016 for Chinese patent application No. 201280048359.5, a counterpart foreign application of U.S. Pat. No. 8,876,373, 4 pages.
Supplemental European Search Report dated Oct. 27, 2010, EP 08798437.3, 7 pages.
The European Office Action mailed on Sep. 16, 2019 for European Patent Application No. 10714734.0, a counterpart of U.S. Pat. No. 8,231,271, 4 pages.
The European Office Action mailed on Sep. 30, 2019 for European Patent Application No. 12820293.4, a counterpart of U.S. Pat. No. 8,876,373, 6 pages.
The Extended European Search Report mailed Jan. 22, 2015 for European patent application No. 12820293.4, 8 pages.
International Preliminary Report on Patentability mailed Feburary 13, 2014 for PCT application No. PCT/US2012/049112, 10 pages.
Non Final Office Action dated Apr. 13, 2020 for U.S. Appl. No. 16/251,774 "IR Thermometry Probe Cover", 10 pages.
Office Action in prior U.S. Appl. No. 12/420,926, mailed May 26, 2011.
Office Action for U.S. Appl. No. 17/085,527, mailed on Sep. 6, 2022, Lane, "IR Thermometry Probe Cover ", 8 pages.
Office Action for U.S. Appl. No. 16/251,774, mailed on Nov. 22, 2019, Lane, "IR Thermometry Probe Cover ", 9 pages.
Office Action for U.S. Appl. No. 13/196,700, mailed on Nov. 29, 2013, John A. Lane, "IR Thermometry Probe Cover", 11 pages.
Office action for U.S. Appl. No. 13/196,700, mailed on Apr. 17, 2014, Lane et al., "IR Thermometry Probe Cover", 7 pages.
Office Action for U.S. Appl. No. 15/784,791, mailed on Apr. 18, 2018, Lane, "IR Thermometry Probe Cover", 6 pages.
Office Action for U.S. Appl. No. 16/251,774, mailed on Jul. 9, 2019. Lane et al., "IR Thermometry Probe Cover " 9 pages.
Office Action for U.S. Appl. No. 14/511,986, mailed on Sep. 15, 2016, Lane et al., "IR Thermometry Probe Cover ", 9 pages.
Search Report for European Application No. 24166392.1, Dated Dec. 3, 2024, 12 pages.

\* cited by examiner

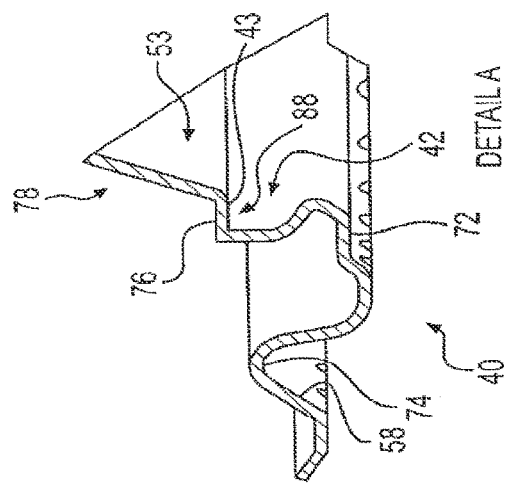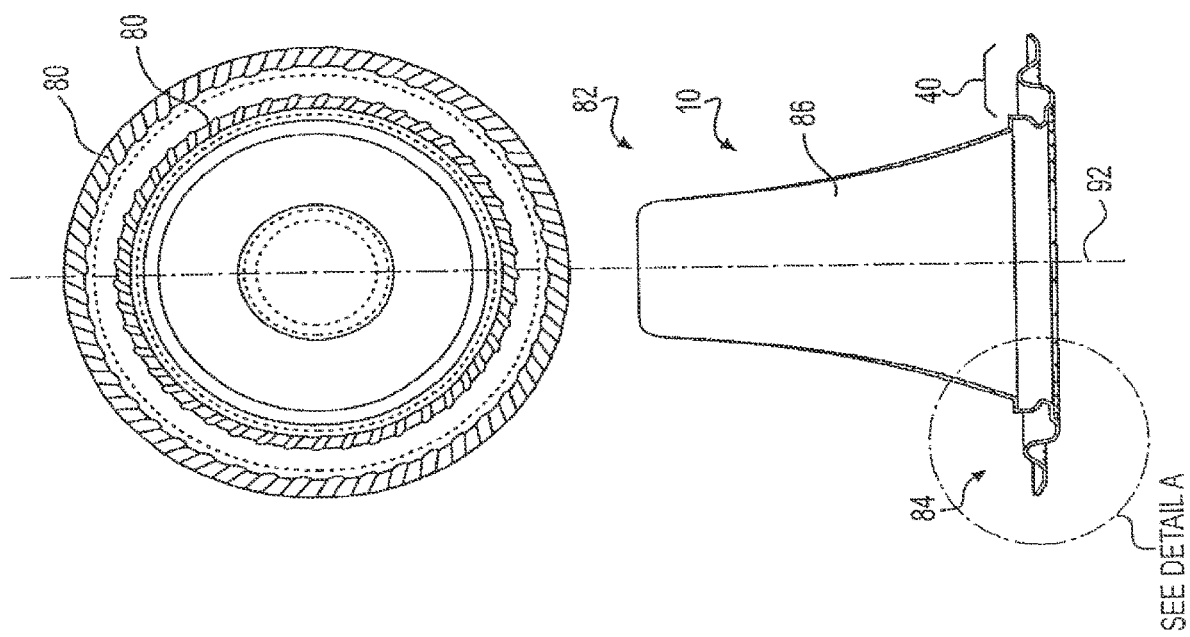
FIG. 12

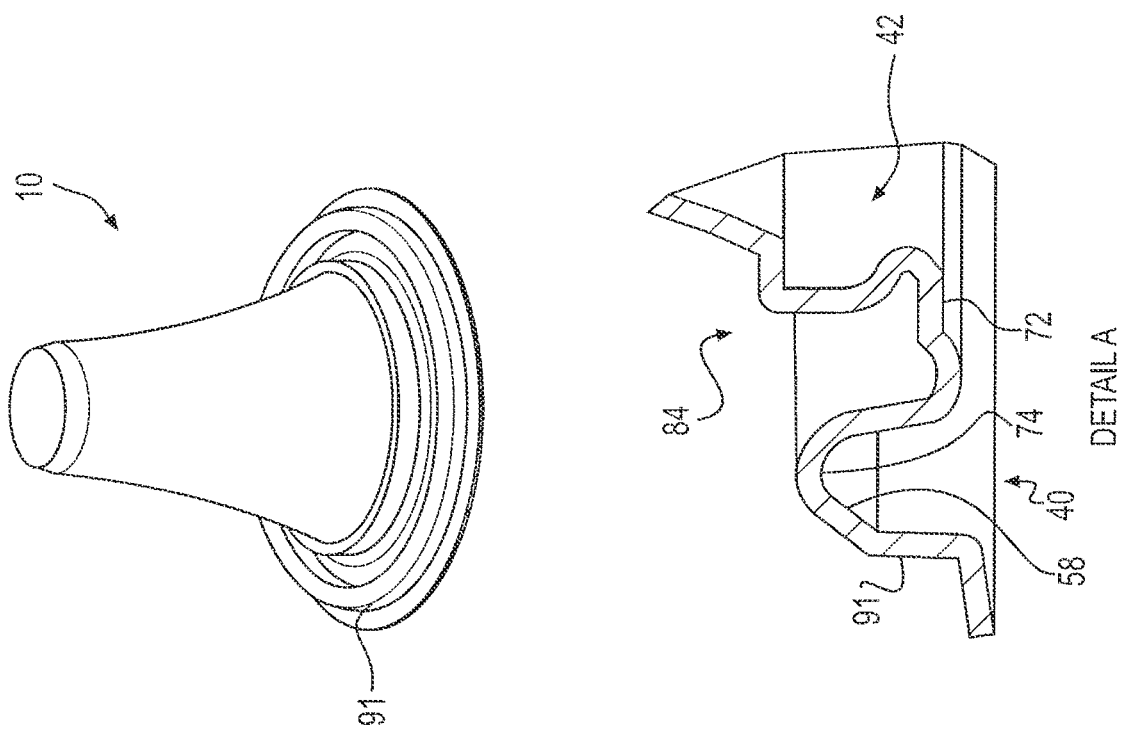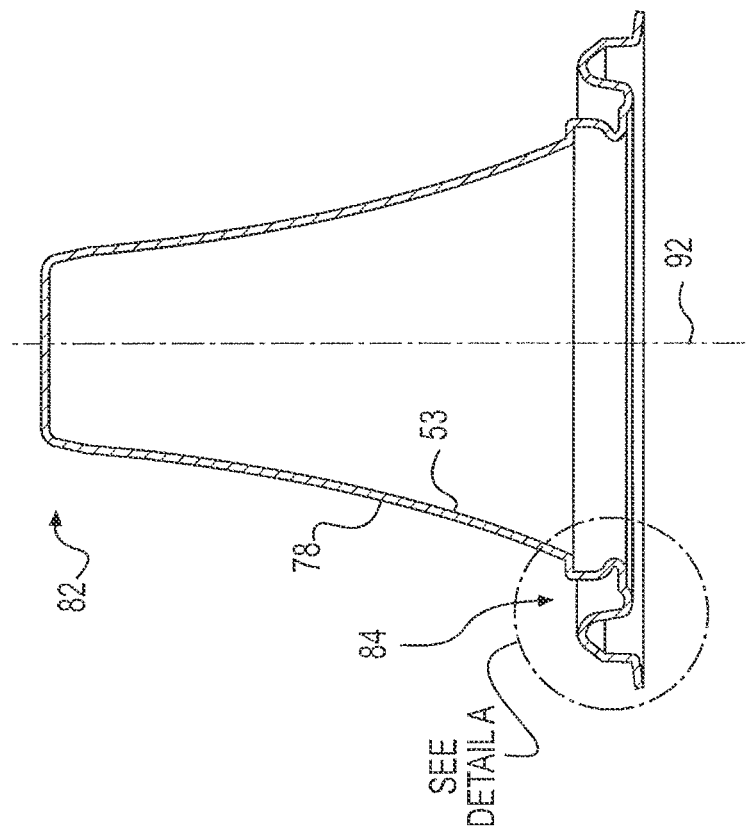
FIG. 17

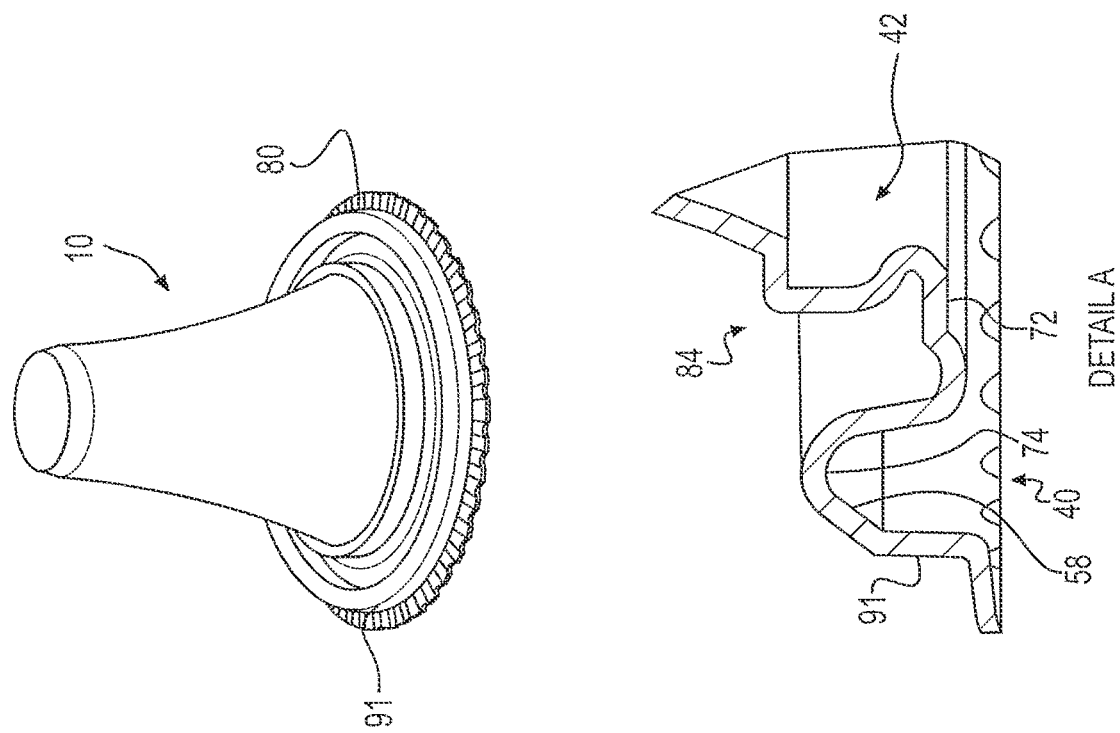
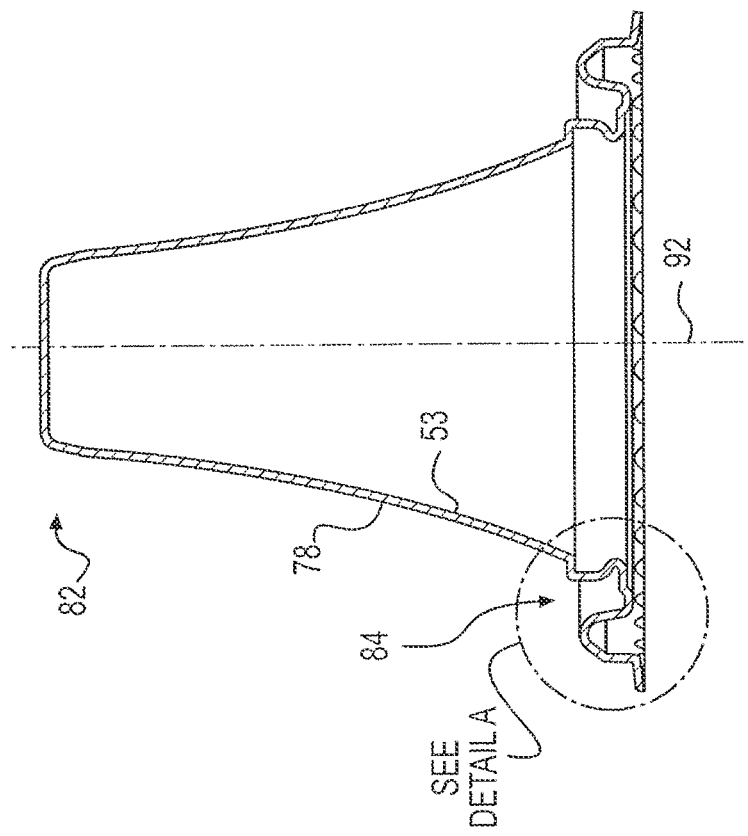
FIG. 18

IR THERMOMETRY PROBE COVER

CROSS-REFERENCE TO RELATED APPLICATIONS

This application is a continuation of U.S. patent application Ser. No. 17/085,527, filed on Oct. 30, 2020, which is a continuation of U.S. patent application Ser. No. 16/251,774, filed on Jan. 18, 2019, now U.S. Pat. No. 10,823,621, which is a continuation of U.S. patent application Ser. No. 15/784, 791, filed on Oct. 16, 2017, now U.S. Pat. No. 10,184,842, which is a continuation of U.S. patent application Ser. No. 14/511,986, filed on Oct. 10, 2014, now U.S. Pat. No. 9,791,326, which is a continuation of U.S. patent application Ser. No. 13/196,700, filed on Aug. 2, 2011, now U.S. Pat. No. 8,876,373, which is a continuation-in-part of U.S. patent application Ser. No. 12/420,926, filed on Apr. 9, 2009, now U.S. Pat. No. 8,231,271. The entire disclosures of each of the above applications are incorporated herein by reference.

FIELD OF THE INVENTION

The present disclosure relates generally to a protective cover for the probe of a medical instrument that is insertable into a body cavity.

BACKGROUND OF THE INVENTION

Many types of medical instruments, such as an infrared (IR) thermometer, contain a probe for insertion into a body cavity so that various body related measurement can be taken. In order to prevent cross-contamination between patients, or health care workers and patients, the probe is generally enclosed within a protective cover which can be disposed of in a sanitary manner after it has been used. Typically the covers are manufactured of plastic using different types of molding techniques, many of which produce products that have surface imperfections or which cannot be held to tight tolerances. In addition, while most protective covers are packaged and shipped with the covers being stacked one inside the other, unstacking such covers and placing them upon the probe of an instrument can be extremely difficult. For example, since such covers are generally connected and/or otherwise loaded onto the medical instrument by pressing the probe onto/into the first cover in the stack, the remaining covers beneath the first probe cover tend to wedge together and/or otherwise bind in the stack with each successive loading operation. As a consequence, such probe covers can be damaged and dropped during removal from the stack. Displacement of a misshaped cover from the instrument probe during an examination can also be unnerving to both the attending health care individuals and the patient. Lastly, defective covers can hang up on the instrument during removal thus requiring unwanted manual handling of a potentially contaminated product.

SUMMARY OF THE INVENTION

It is therefore a primary object of the embodiments described in this disclosure to improve disposable probe covers that are suitable for use in the protection of insertion probes of medical instruments.

Another object of the present disclosure is to provide for easy removal of a protective probe cover from a supply stack of covers.

A further object of the present disclosure is to more positively secure a protective probe cover to a medical instrument to insure that the cover does not become dislodged during a patient examination.

A still further object of the present disclosure is to allow for the free release of a used probe cover from a medical instrument.

Yet another object of the present disclosure is to minimize the amount of manual handling that is required when loading and unloading a protective probe cover from a medical instrument.

Still another object of the present disclosure is to minimize the risk of damaging a protective probe cover as the cover is being loaded upon a medical instrument.

These and other objects of the present disclosure are attained by a removable protective cover for a medical instrument that contains a probe that is suitable for insertion into a body cavity. The cover contains a flexible tubular body that compliments the probe and/or tip geometry of the instrument and a radially disposed flange that surround the proximal end of the body. A series of snap on fasteners removably connect the cover to the instrument. A camming surface is located on the outer face of the flange which coacts with a cam follower that is movably mounted upon the instrument to flex the cover sufficiently to open the fastener and release the cover from the instrument. Alignment tabs are further provided on the flange that mate with openings in the instrument to properly register the cover with regard to the instrument.

In another exemplary embodiment of the present disclosure, a probe cover for a medical instrument includes a distal end, a proximal end opposite the distal end, and an annular flange extending around the proximal end. The probe cover also includes a camming surface defined by the flange and configured to mate with an ejector mechanism of the instrument. A section of the flange may be configured to flex in response to application of a force to the camming surface by the ejector mechanism, wherein such flexing releases the cover from the instrument.

In a further exemplary embodiment of the present disclosure, a method of removing a probe cover from a medical instrument includes slidably engaging a cam follower surface of the medical instrument with a camming surface of the cover, the camming surface extending at least partially around a proximal end of the cover. The method also includes flexing a section of the proximal end in response to the engagement between the cam follower surface and the camming surface, and disengaging a cove defined by an inner surface of the cover from a detent bead of the instrument in response to the flexing.

In yet another exemplary embodiment of the present disclosure, a system for probe cover storage includes a first probe cover having a distal end, a proximal end, an annular flange extending around the proximal end, and a camming surface defined by the flange and configured to mate with an ejector mechanism of the instrument. A section of the flange may be configured to flex in response to application of a force to the camming surface by the ejector mechanism. The first probe cover also includes a shelf extending along at least a portion of an outer surface of the flange and substantially perpendicular to a longitudinal axis of the cover. In such an exemplary embodiment, the system also includes a second probe cover stacked on top of the first probe cover such that the distal end of the first probe cover is disposed substantially adjacent to a distal end of the second probe cover. The second probe cover includes a base disposed on the shelf of the first probe cover such that a gap is formed between the first probe cover and the second probe cover, the gap extending from the shelf to the distal end of the first probe cover.

In still another exemplary embodiment of the present disclosure, a method of storing probe covers for a medical instrument includes desirably positioning a first probe cover at a storage location, and disposing a second probe cover on top of the first probe cover such that a distal end of the first probe cover is located substantially within a distal end of the second probe cover and a proximal end of the first probe cover is located substantially directly beneath and adjacent to a proximal end of the second probe cover. The method also includes mating a base formed on an inner surface of the second probe cover with a shelf formed on an outer surface of the first probe cover, the base maintaining a gap extending between the first and second surface.

In a further exemplary embodiment of the present disclosure, a probe cover for a medical instrument includes a substantially conical body having a distal end, a proximal end, and a flange annularly surrounding the proximal end, the body defining a longitudinal axis and tapering away from the longitudinal axis from the distal end toward the proximal end. The probe cover also includes an IR transparent lens disposed at the distal end of the body, and a cove formed by an inner surface of the body, the cove extending annularly around the body and being configured to receive a plurality of detent beads of the instrument for releasably connecting the probe cover to the instrument. The probe cover further includes a camming surface defined by the flange and configured to receive an ejector finger of the instrument, and a weakened section formed proximate the cove. The weakened section is configured to bend in response to an upward force applied to the camming surface by the ejector finger, wherein bending of the weakened section removes the cove from the plurality of detent beads and releases the probe cover from the instrument. In such an exemplary embodiment, the cover further includes an annular shelf extending transverse to the longitudinal axis, the shelf being disposed substantially above the cove and defined by a portion of an outer surface of the cover opposite the cove. Such an exemplary probe cover also includes a base configured to rest upon a shelf of an additional probe cover stacked therebeneath, wherein a maximum vertical distance between the camming surface and the base is greater than or equal to approximately half of a maximum vertical distance between the cove and the base. Moreover, in such an exemplary embodiment, a horizontal distance between a vertically uppermost portion of the face and a radially outermost portion of the cove is less than approximately twice the maximum vertical distance between the cove and the base.

BRIEF DESCRIPTION OF THE DRAWINGS

For a better understanding of these and other objects of the present disclosure, reference will be made to the following detailed description of the invention which is to be read in association with the accompanying drawings, wherein:

FIG. 12 illustrates a plan view and a cross-sectional view of a probe cover according to a further exemplary embodiment of the present disclosure, with a portion broken away to show the probe cover in greater detail;

FIG. 17 is an isometric view and a cross-sectional view of a probe cover according to another exemplary embodiment of the present disclosure, including a portion broken away to show the probe cover in greater detail; and FIG. 18 is an isometric view and a cross-sectional view of a probe cover according to still another exemplary embodiment of the present disclosure, including a portion broken away to show the probe cover in greater detail.

DESCRIPTION OF THE INVENTION

Figure 1:
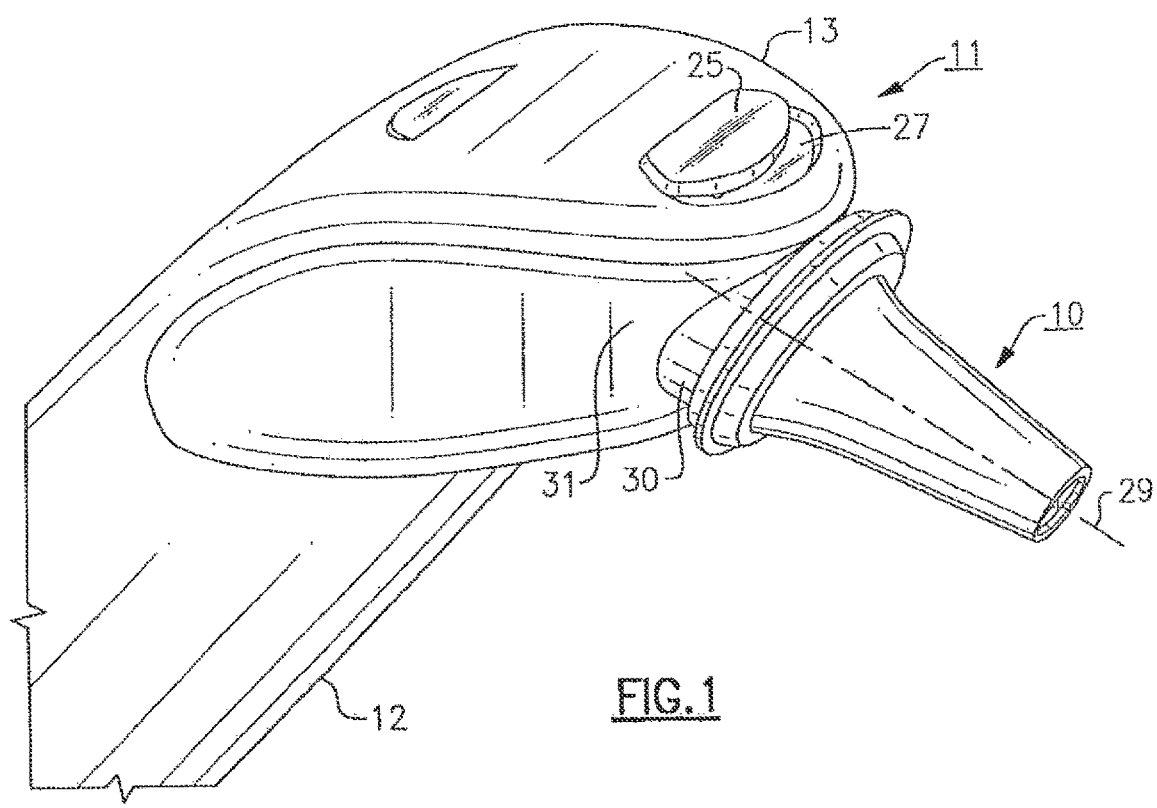
FIG. 1 is a partial view in perspective illustrating the probe end of a medical instrument showing a protective cover embodying the invention securely affixed to the instrument.
Figure 2:
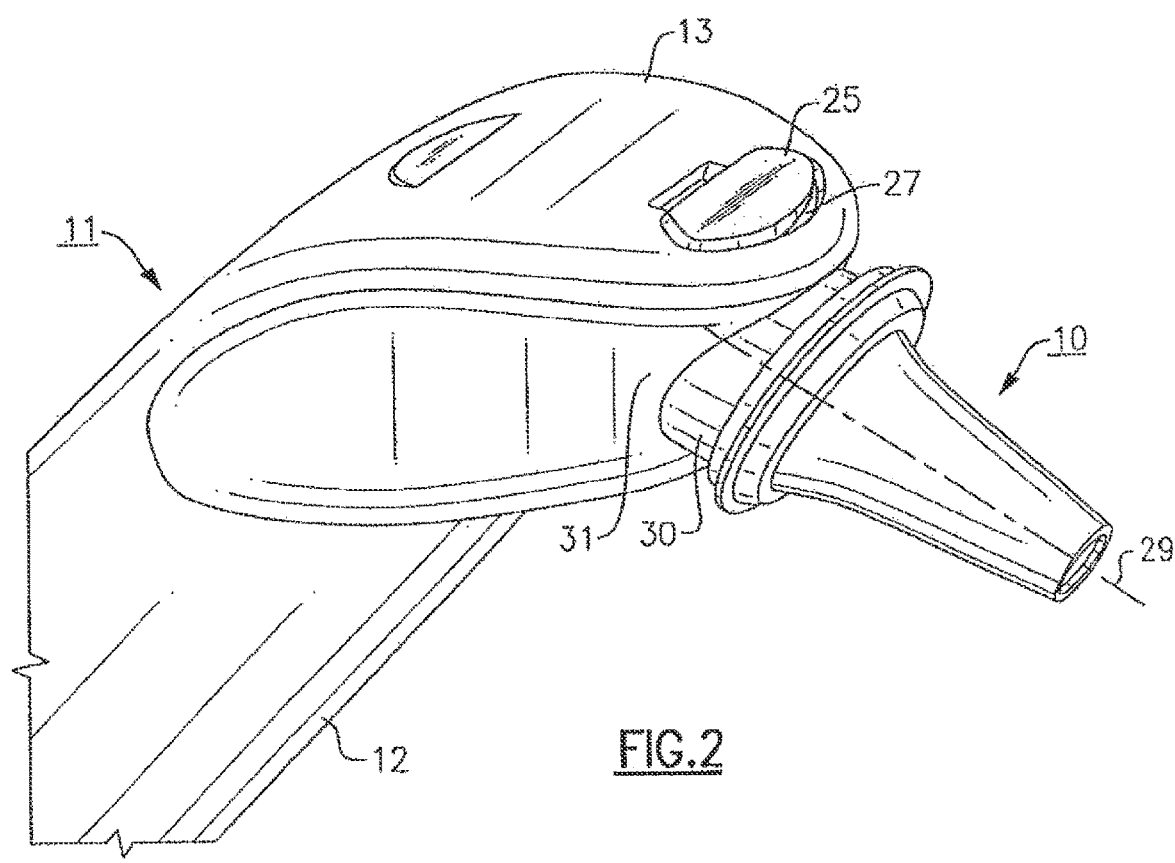
FIG. 2 is a perspective view similar to that illustrated in FIG. 1. showing the protective cover moved to a release position.
Figure 3:
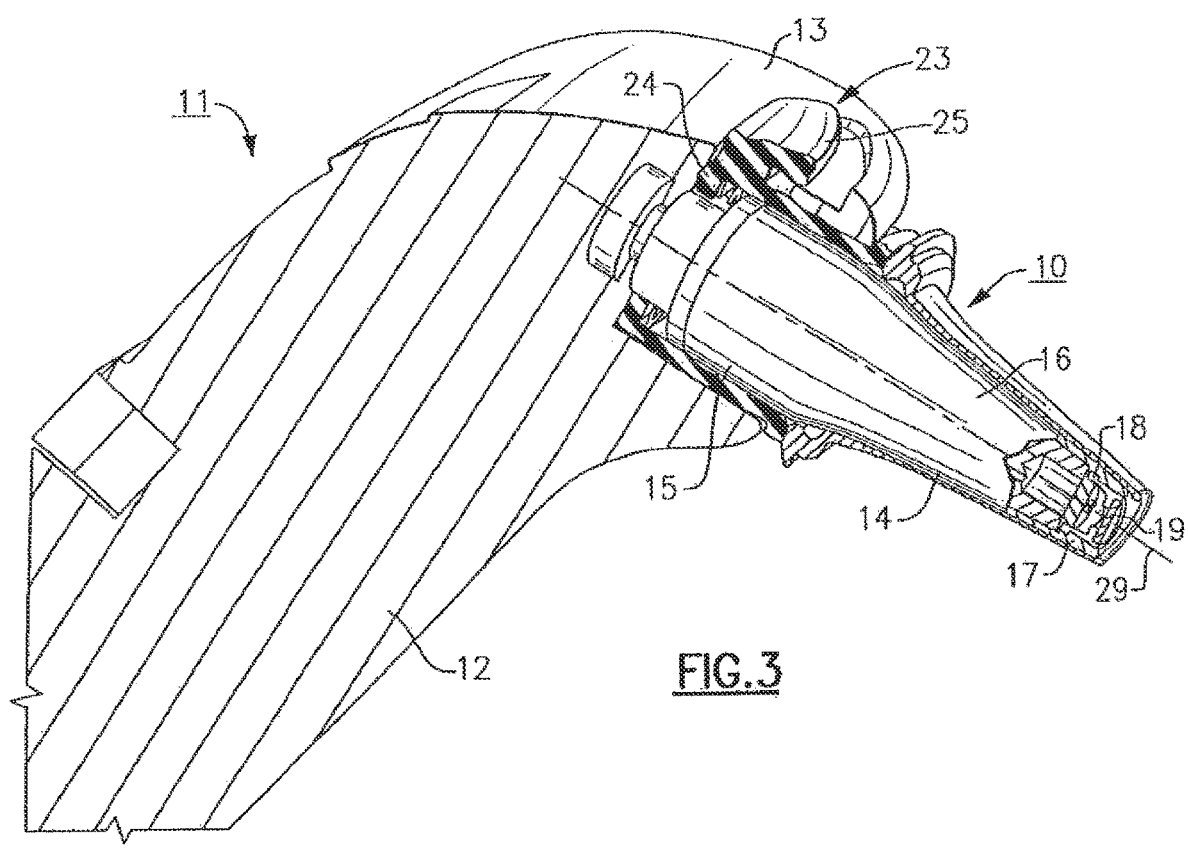
FIG. 3 is a further perspective view of the probe end of an IR thermometer with portion broken away to show the apparatus of the invention in greater detail.

Referring initially to FIGS. 1-3, the present disclosure relates to a protective probe cover, generally referenced 10, that will be described herein with regard to an infrared thermometer 11. It should be clear to one skilled in the art, however, that an embodiment of the present disclosure can be used in conjunction with various other medical instruments having an extended probe for insertion into a body cavity. As pointed out above, disposable protective covers are placed over the probes to mitigate the danger of cross contamination occurring during and after an examination. The covers found in the prior art are typically made of plastic and are fabricated using various molding processes. Many of these molding methods, however, create imperfections in the final product and are unable to hold the product to close tolerances, thus resulting in unwanted and potentially dangerous problems arising particularly during a medical procedure.

Testing has shown that probe covers that are fabricated by the injection molding process can be held to tight tolerances while still having a desired amount of flexibility that help overcome many fabrication problems. Accordingly, the exemplary probe covers described herein may comprise plastic covers that have been formed by one or more of vacuum forming, thermoforming, and injection molding.

FIGS. 1-3 illustrate the top section of a hand held IR thermometer 11. The instrument includes a lower body section 12 and an upper head section 13 that contains an insertion probe that protrudes outwardly some distance from the head of the instrument. As illustrated in FIG. 3, the proximal end section 15 of the probe is cylindrical in form and is secured by any suitable means to the head. The distal end 16 of the probe projects outwardly from the head and is conical shaped so as to taper downwardly from the cylindrical body of the probe towards the distal end tip 17. An IR sensor 18 is mounted in the tip of the probe. Although not shown, the sensor 18 is connected by electrical leads to a processor that is located within the body of the instrument which provides an accurate temperature read out to the user.

The probe cover 10 is shown in FIGS. 1 and 3 mounted upon the extended end of the probe in a locked position wherein the cover is securely fastened to the probe. The inner wall surface 53 of the cover complements the conical wall surface of probe. As will be explained in further detail below, the cover 10 may be releasably secured to the probe by a series of snap-on fasteners 50. As illustrated in FIG. 3, an ejector mechanism, generally referenced 25, is slidably mounted inside the instrument head upon the cylindrical section of the probe. The ejector mechanism is equipped with a circular ring 24 that surrounds the cylindrical section of the probe to provide a close running fit therebetween so that the ejector mechanism can be moved, for example, axially along the centerline 29 of the probe between a first cover locking position and a second cover releasing position. In additional exemplary embodiments, the ejector mechanism, or at least a component thereof, may be moved along an arcuate path to facilitate release of the cover 10.

The ring of the ejector mechanism contains a raised finger-engageable control button 26 that passes upwardly through an opening 27 contained in the head of the instrument. When the control button is situated at the back of the opening as shown in FIG. 1, the ejector mechanism is in the first probe locking position. Manual movement of the control button to the front of the opening as illustrated in FIG. 2 places the ejector mechanism a second probe releasing position.

Figure 4:
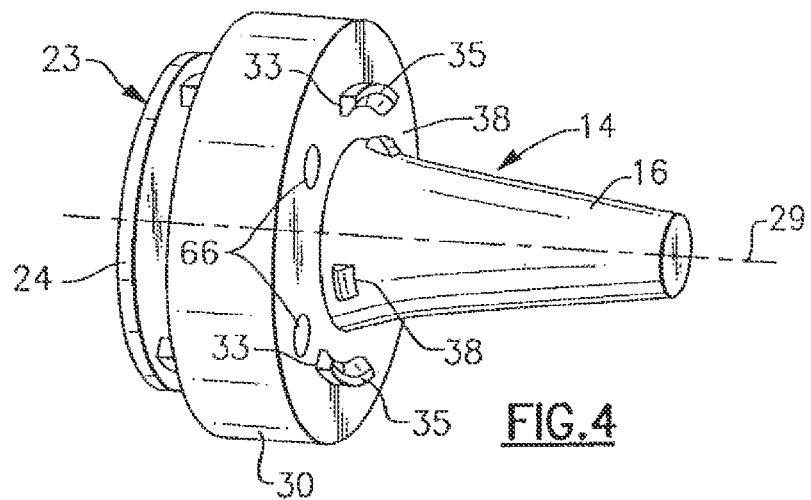
FIG. 4 is a prospective view of the tip end of probe for use in a medical instrument embodying the present invention with the protective cover removed.
Figure 6:
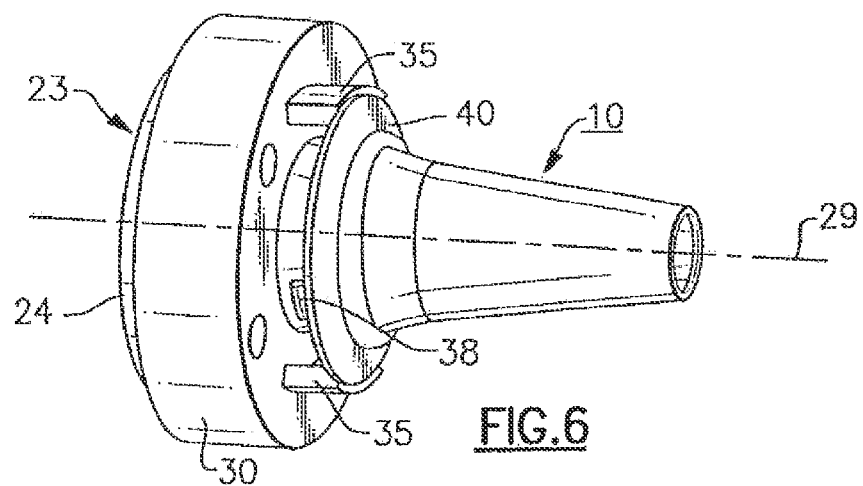
FIG. 6 is a prospective view similar to that shown in FIG. 5 with the cover mounted upon the probe tip in an unsecured condition.
Figure 5:
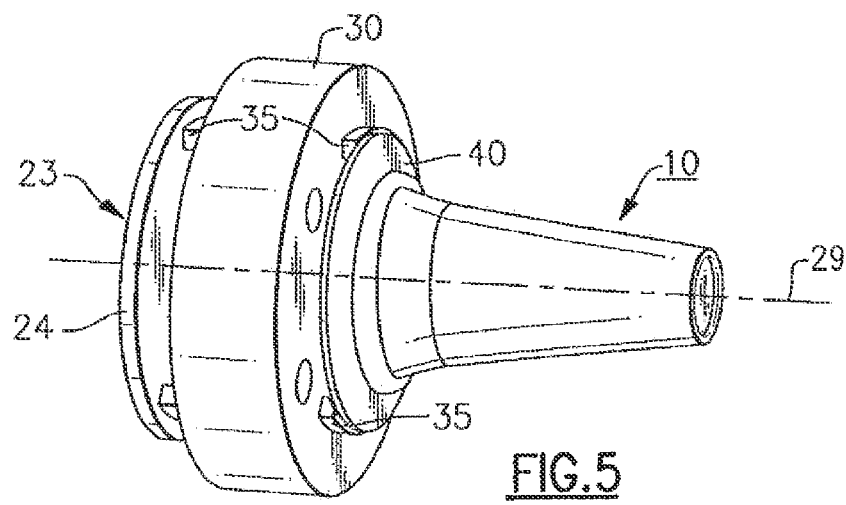
FIG. 5 is a prospective view similar to that illustrated in FIG. 4 showing a protective cover secured to the tip of the instrument probe.

Turning now to FIGS. 4-6 there is illustrated the front circular shoulder mount 30 of the probe assembly which is retained within the front wall 31 of the instrument head to support the distal end 16 of the probe in assembly. FIG. 4 shows the probe without a cover. Two opposed arcuate shaped slots 33-33 are located in the probe mount 30 that are centered upon the longitudinal axis 29 of the probe. A pair of arcuate shaped fingers 35-35 that are integrally joined to the ejector ring 24 and are slidably contained within the slots 33-33. The fingers are arranged to be extended and retracted along an upward and/or arcuate path as the ejector moves between the first and second positions. A series of circumferentially spaced segmented detent beads 38-38 are mounted upon the probe and, as will be explained in greater detail below, each bead section is the male part of a two-part snap on fitting for releasably securing the probe cover 10 to the instrument. Preferably three equally spaced fittings are employed to secure the cover to the instruments, however, more or less fittings may be employed depending upon the particular application.

FIG. 5 illustrates a protective cover 10 mounted in a locked position upon the probe. At this time, the flange 40 of the cover has engaged the fingers 35-35 of the ejector mechanism and has moved the ejector back to the cover locking position due to the rearward movement of the cover over the probe. Full rearward movement is attained when the snap-on fasteners engage the bead segments on the probe.

FIG. 6 illustrates a probe cover located upon the probe with the ejector mechanism in the cover releasing position. At this time the control button 25 (FIG. 3) has been moved forward causing the ejector mechanism to unlock the fasteners thus releasing the cover. In addition the continued movement of the ejector toward the distal end of the probe frees the cover from the probe.

Figure 7A:
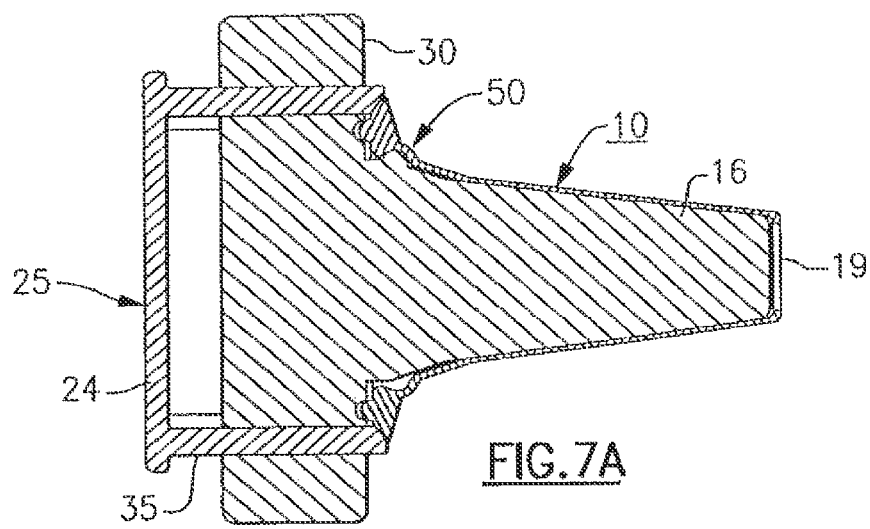
FIG. 7A is a partial view in section showing the probe tip of a medical instrument with a protective cover secured to the instrument in a locked position.
Figure 8:
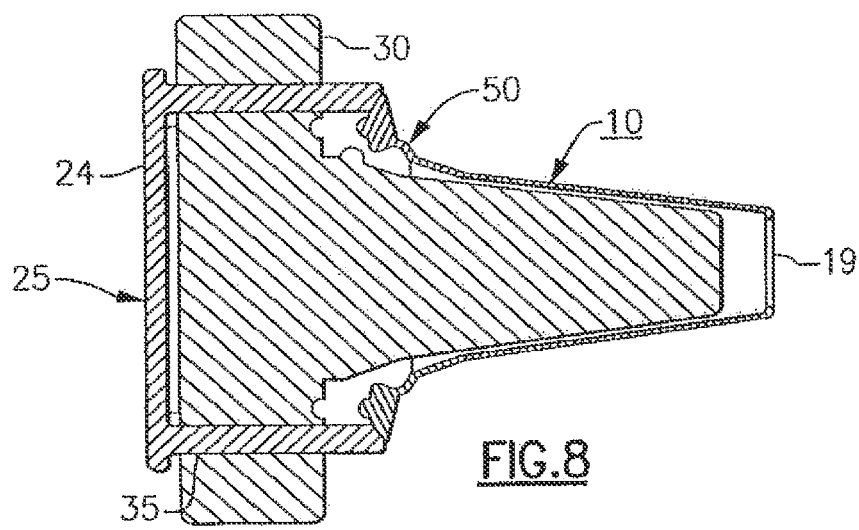
FIG. 8 is a view similar to FIG. 7A showing the ejector mechanism moved to a releasing position.
Figure 7B:
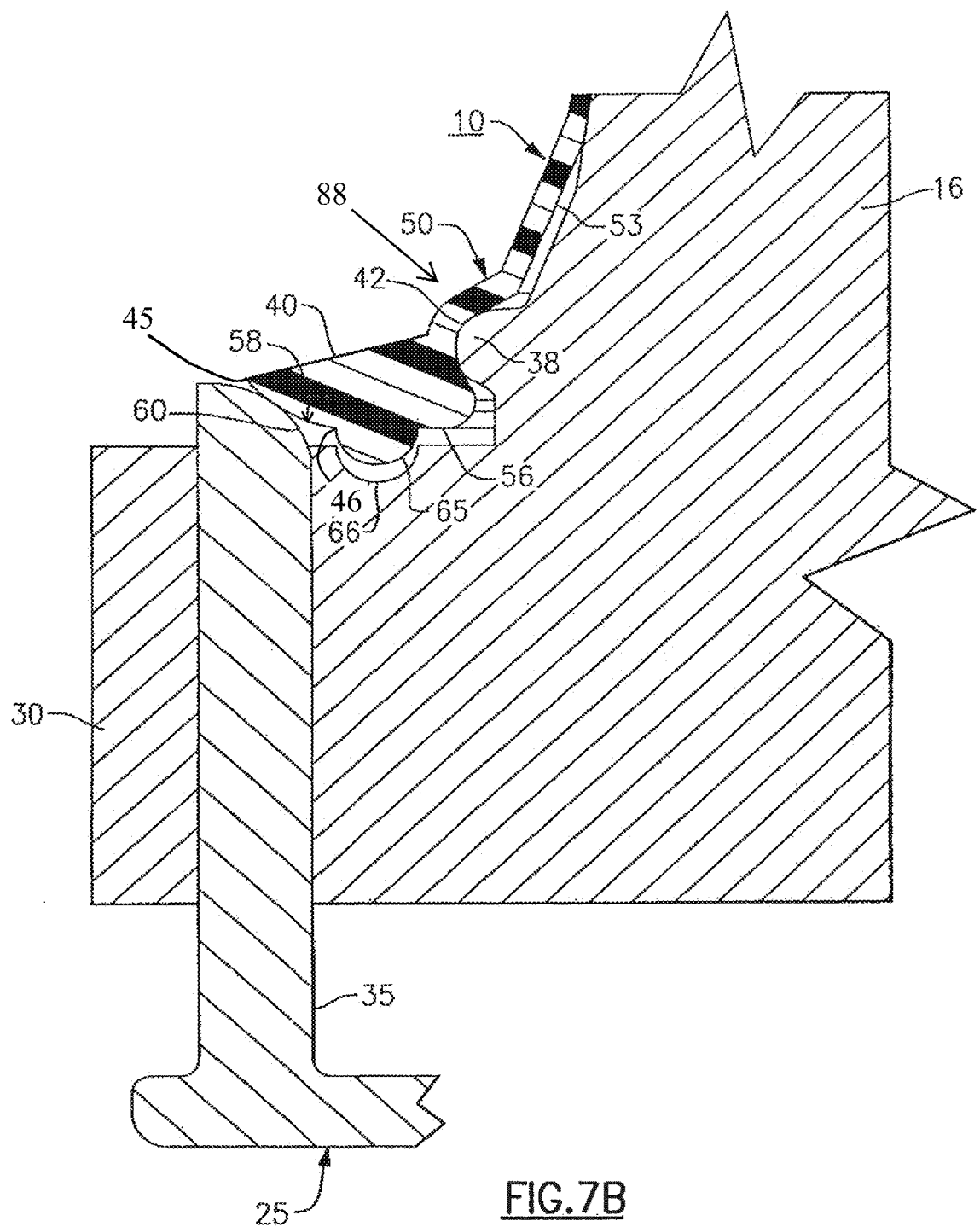
FIG. 7B is an enlarged partial view showing in greater detail one of the snap-on fasteners in a locked position as well as the cover ejector mechanism.

FIGS. 7A, 7B, and 8 illustrate a first embodiment of the apparatus for securing and releasing a probe cover from the instrument. FIG. 7A shows the above described ejector mechanism 25 moved back into the first cover locking position and a snap-on fasteners generally reference 50 in a cover securing condition. At this time the cover is snuggly contained upon the probe. The cover contains an IR transparent lens or window 19 mounted in the distal tip thereof which is now located in close proximity with the IR sensor 18 (see FIG. 3).

With further reference to FIG. 7B the securing and releasing apparatus is shown in further detail in the locked position. Each snap-on fastener 50 includes two mating parts or sections. These include the previously noted bead segment 38 located upon the probe surface that mates with an arcuate and/or otherwise operatively shaped cove 42 that is contained in and/or formed by the inner wall surface 53 of the cover and/or the flange 40. The cove 42 preferably extends circularly about the axis of the cover and services each of the detent beads. The cover wall section that encircles the cove 42 provides a weakened section 88 in the cover about which the cover can flex when an upward force is applied to the flange 40, such as at an outer face 56 of the flange. Such a weakened section 88 may be disposed proximal to or distal to the cove 42. In an exemplary embodiment, a circular camming surface 58 is contained in the outer face 56 of the flange 40 that runs along the rim of the flange 40. In additional exemplary embodiments, the camming surface 58 may be defined by any portion of the flange 40 convenient for receiving a component of the ejector mechanism 25. The camming surface 58 may be angularly offset with regard to the axis of the cover. As shown in at least FIG. 7B, an example camming surface 58 may be substantially convex, and may include a proximal end 46 and a distal end 45. The distal end of the two fingers 35 of the ejector mechanism is provided with an arcuate surface 60 that is arranged to ride in contact with camming surface 58 as the ejector mechanism moves between the first and second positions. Surface 60 thus serves as a cam follower in system. Although surface 60 is shown arcuate in form, it can, in practice, be a flat surface that rides in sliding contact with camming surface 58 without departing from the teachings of the present invention.

FIG. 7B shows the probe cover 10 in a locked position with the snap fitting closed thereby securing the cover to the probe. At this time the ejector mechanism is in the cover locking position. Moving the ejector button forward moves the cam follower against the camming surface of flange causing the lower portion of the cover to flex about the weakened wall section which surrounds the cove 42. Sufficient flexure is provided to free the detent beads 38 from the cove 42. Thus, releasing the cover from the probe. As shown in FIG. 8, further forward movement of the ejector moves the cover well clear of the probe surface so that it can fall easily from probe under the influences of gravity.

A series of semi circular tabs 65 are circumferentially spaced upon the outer face of the flange and arranged to mate with openings 66 in the raised shoulder 30 of the probe so that the snap-on fittings will mate properly at the time of closure.

FIGS. 11-18 illustrate additional exemplary embodiments of the probe cover 10. As shown in, for example, FIG. 11, an exemplary probe cover 10 may define a distal end 82, a proximal end 84 opposite the distal end 82, and an annular flange 40 extending around the proximal end 84. The probe cover 10 may also define a longitudinal axis 92.

Figure 11:
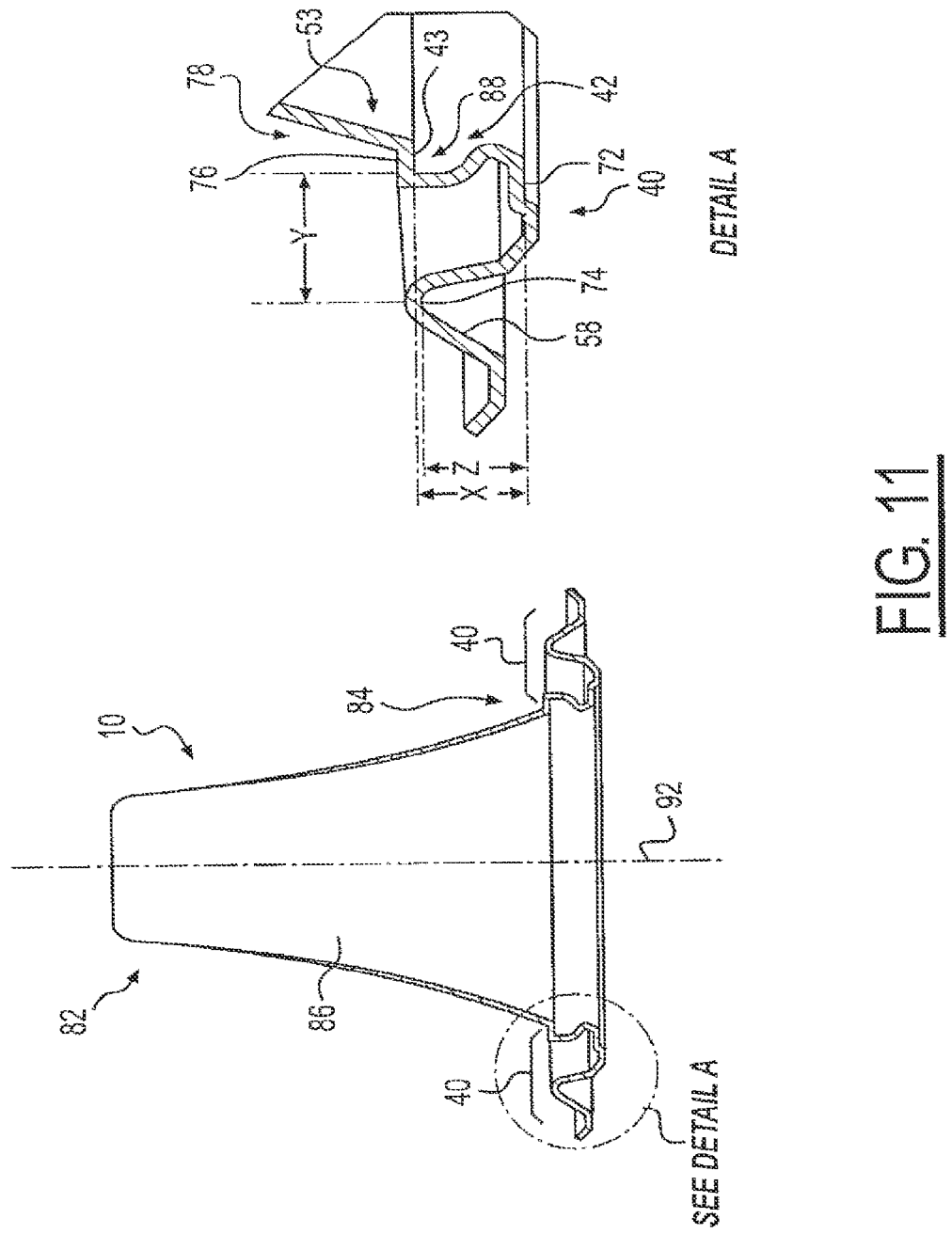
FIG. 11 is a cross-sectional view of a probe cover according to another exemplary embodiment of the present disclosure, including a portion broken away to show the probe cover in greater detail.
Figure 13:
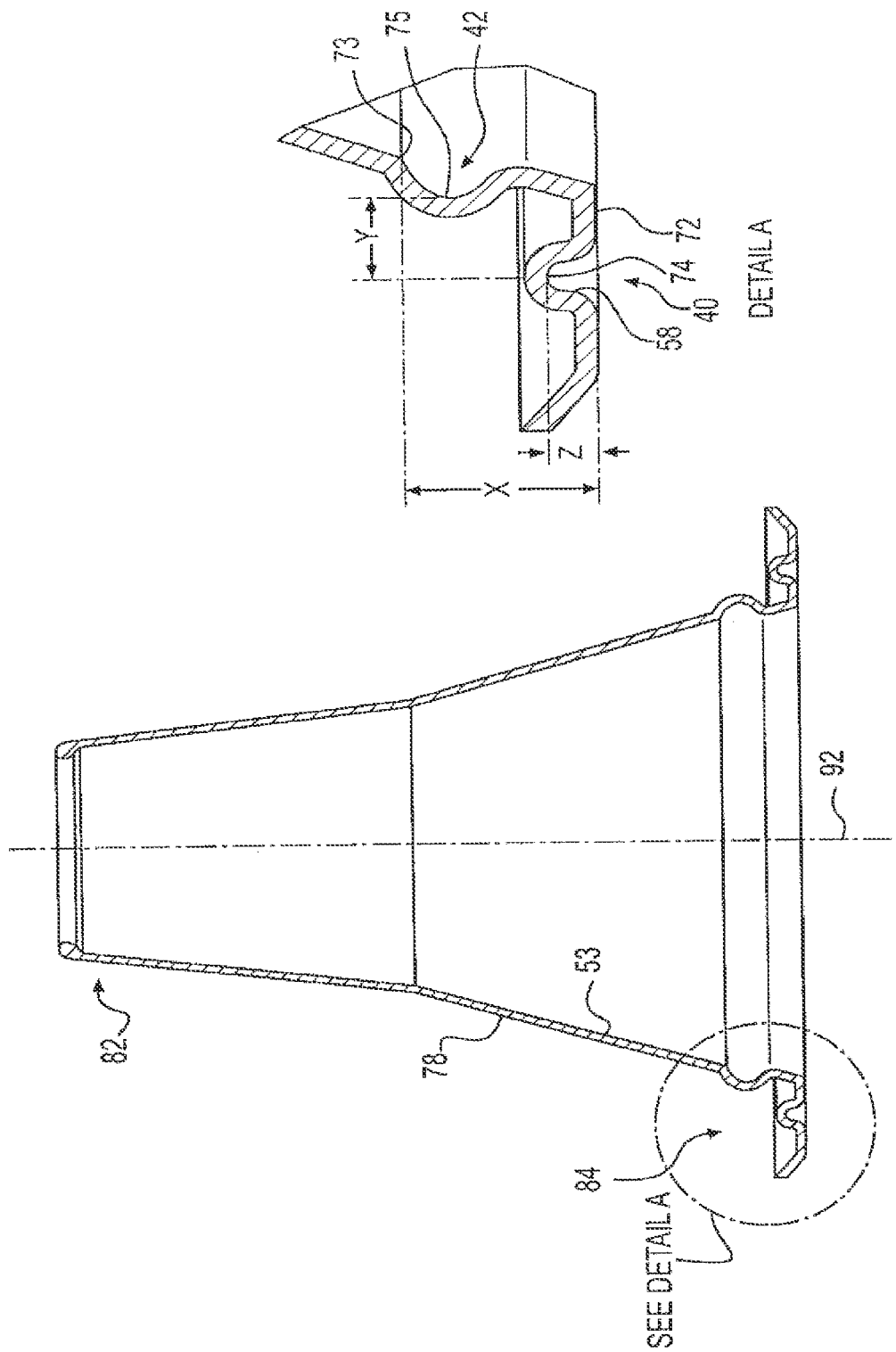
FIG. 13 is a cross-sectional view of a probe cover according to still another exemplary embodiment of the present disclosure, with a portion broken away to show the probe cover in greater detail.

In such an exemplary embodiment, the proximal end 84 and/or the flange 40 may define one or more components of the probe cover 10. For example, the flange 40 may define the camming surface 58. The camming surface 58 may be formed at any desirable angle relative to the longitudinal axis 92 to facilitate engagement with one or more components of the ejector mechanism 25 discussed above. For example, as shown in FIG. 11, the camming surface 58 may be disposed at an acute included angle relative to the longitudinal axis 92 to facilitate a camming and/or otherwise slidable relationship between the camming surface 58 and, for example, a finger 35 of the ejector mechanism 25. In an exemplary embodiment, the camming surface 58 may taper substantially upwardly and substantially inwardly from the proximal end 84 of the cover 10 toward the longitudinal axis 92 and/or the distal end 82.

In such an exemplary embodiment, the camming surface 58 may define a peak 74 disposed at a highest vertical elevation along the camming surface 58 and relative to the longitudinal axis 92. In an exemplary embodiment, the peak 74 may be formed by a substantially rounded portion of the camming surface 58 and/or of the inner surface 53 of the probe cover 10. Alternatively, the peak 74 may be defined as an angled portion of the camming surface 58 and/or of the inner surface 53.

As shown in FIG. 11, one or more portions of the flange 40 may also define the weakened section 88. In an exemplary embodiment, the weakened section 88 may be formed by a portion of the cove 42. In additional exemplary embodiments, the weakened section 88 may be disposed adjacent to the portion of the flange 40 forming the camming surface 58. As will be described in greater detail below with respect to, for example, FIG. 14, the weakened section 88 may be configured to bend, and/or otherwise flex in response to application of a force to the camming surface 58, and the range of flexing may depend upon, for example, the shape, size, and/or other configurations of the section 88.

In addition, the flange 40 may define a base 72 of the probe cover 10. In an exemplary embodiment, the base 72 may be substantially annular and, in an additional exemplary embodiment, the flange 40 may define a channel, break, and/or space (not shown) between two or more adjacent bases 72. Such a channel, break, and/or space may assist in reducing and/or eliminating, for example, the formation of a negative pressure between two adjacent stacked probe covers 10 during storage, and may thereby assist in removing such probe covers 10 from the stack for usage.

As shown in FIG. 11, the base 72 may comprise a substantially horizontal platform and/or other like surface configured to support the probe cover 10 while stacked, while in storage, and/or while removably connected to a medical instrument during use. As shown in, for example, FIG. 15, the base 72 may extend substantially perpendicular to the longitudinal axis 92 and may be configured to rest upon a shelf 76 of an additional probe cover 10 stacked there beneath. In this way, the base 72 may be analogous to the tabs 65 shown in, for example, FIG. 10. Such an exemplary shelf 76 may be defined by the flange 40, and in an exemplary embodiment, the shelf 76 may extend along at least a portion of an outer surface 78 of the probe cover 10 and/or flange 40. It is understood that the outer surface 78 of the probe cover 10 may form the outer surface of the flange 40, and the inner surface 53 of the probe cover 10 may form the inner surface of the flange 40. As shown in FIG. 11, in an exemplary embodiment, the shelf 76 may extend substantially perpendicular to the longitudinal axis 92 of the cover 10. In additional exemplary embodiments, the shelf 76 may extend at any desirable angle relative to the longitudinal axis 92 to facilitate support of an additional probe cover 10 stacked thereon and/or to assist in releasably connecting the probe cover 10 to a medical instrument.

In an exemplary embodiment, the cove 42 may be defined by the inner surface 53 of the probe cover 10, and at least a portion of the cove 42 may be formed by the flange 40. As described above, the cove 42 may be shaped, sized, positioned, and/or otherwise configured to releasably mate with one or more detent beads 38 (FIG. 14) to facilitate a removable connection between the medical instrument and the probe cover 10. In an exemplary embodiment, the cove 42 may be formed by the same portion of the flange 40 forming the shelf 76. In particular, the cove 42 may be disposed substantially beneath the shelf 76 such that the cove 42 is at least partially defined by the same portion of the flange 40 that forms the shelf 76. As shown in FIG. 11, a remainder of the cove 42 may be formed by one or more substantially vertical and/or otherwise angled, bent, and/or curved portions of the flange 40 and/or the inner surface 53.

Figure 14:
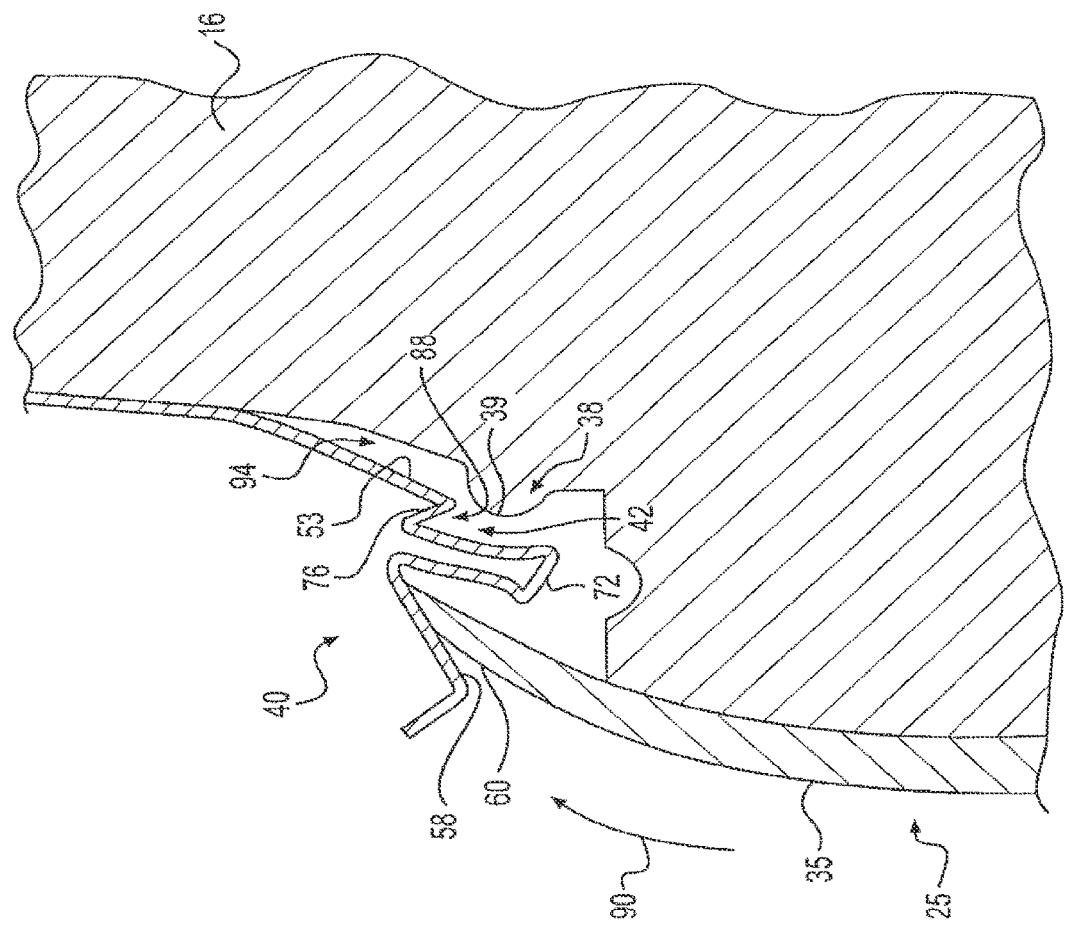
FIG. 14 is a partial cross-sectional view of an exemplary probe cover of the present disclosure being acted on by an ejector mechanism.

As is also illustrated in FIG. 11, one or more spatial and/or dimensional relationships may be maintained between the components of the probe cover 10 described herein. Such relationships may assist in, for example, releasing the probe cover 10 from the medical instrument upon the application of sufficient force by the ejector mechanism 25 (FIG. 14). For example, an exemplary probe cover 10 may define a maximum vertical distance Z between the camming surface 58 and the base 72. As shown in FIG. 11, the maximum vertical distance Z may be measured from the base 72 to the peak 74, in a direction parallel to the longitudinal axis 92. The probe cover 10 may also define a maximum vertical distance X between the cove 42 and the base 72. The maximum vertical distance X may be measured from, for example, an uppermost portion of the cove 42 such as, for example, from substantially flat ceiling 43 of the cove 42 illustrated in FIG. 11. In an alternative exemplary embodiment in which the cove 42 is substantially rounded, such as the exemplary embodiment illustrated in FIG. 13, the maximum vertical distance X may be measured from the base 72 to a distal-most portion 73 of the cove 42.

In the exemplary embodiments described herein, the maximum vertical distance Z between the camming surface 58 and the base 72 may be greater than or equal to approximately half of the maximum vertical distance X between the cove 42 and the base 72. In additional exemplary embodiments, the maximum vertical distance Z may be greater than or equal to approximately 3/5 of the maximum vertical distance X. In still further exemplary embodiments, other desirable relationships between the maximum vertical distances, Z, X may be maintained in order to facilitate, for example, flexing of the weakened section 88 and/or release of the probe cover 10 from the medical instrument. In the exemplary embodiments of the present disclosure, the distance X may be between approximately 2.2 mm and approximately 2.3 mm. For example, the distance X may be equal to approximately 2.28 mm. In addition, the distance Z may be between approximately 1.7 mm and approximately 1.8 mm. For example, the distance Z may be equal to approximately 1.78 mm.

In addition, any desirable horizontal distance Y between the peak 74 of the camming surface 58 and a radially outer-most portion of the cove 42 may be maintained to facilitate flexing of the weakened section 88. In exemplary embodiments, it may be desirable to minimize the horizontal distance Y in order to reduce the distance the camming surface 58 and/or the finger 25 must travel in order to release the cover 10 from the medical instrument. Reducing the distance Y may, thus, result in easier and/or quicker release of the probe cover 10 from the instrument. As shown in FIG. 11, the horizontal distance Y may be measured from the radially outer most portion of the cove 42 and, in exemplary embodiments in which the cove 42 is substantially rounded (FIG. 13) the distance Y may be measured from a horizontal peak 75 of the cove 42. In exemplary embodiments of the present disclosure, the horizontal distance Y may be less than approximately twice the maximum vertical distance X between the cove 42 and the base 72. In such exemplary embodiments, the distance X may have any of the values discussed above and the distance Y may be between approximately 2.2 mm and approximately 2.3 mm. For example, the distance Y may be equal to approximately 2.275 mm.

As shown in FIG. 12, in additional exemplary embodiments, the probe cover 10 may include one or more ribs 80. Such ribs 80 may be disposed on, for example, a radially outer-most portion of the flange 40. In addition, and/or alternatively, such ribs 80 may be disposed on one or more inner-portions of the flange 40. Such ribs 80 may assist in strengthening portions of the flange 40 and/or providing a desired level of structural rigidity thereto. Such added strength and/or structural rigidity may improve the functionality of, for example, the camming surface 58, the weakened section 88, and/or the cove 42. For example, such added structural rigidity may assist the camming surface 58 in mating with the fingers 35 of the ejector mechanism 25 in order to desirably release the cover 10 from the medical instrument. In addition, such structural rigidity may assist the cove 42 in removably connecting with the detent bead 38. In further exemplary embodiments, such ribs 80 may also assist in desirably spacing and/or aligning 2 or more probe covers 10 in a stacked configuration. For example, such ribs 80 may assist in spacing each of the probe covers 10 relative to each other to further facilitate removal of each individual covers 10 from the stack. Such ribs 80 may have any shape, size, orientation, and/or other configuration in order to accentuate some of the advantages described above. In addition, while FIG. 12 illustrates a plurality of ribs 80 disposed along an entire circumference of the probe cover 10, in additional exemplary embodiments, it is envisioned that one or more ribs 80 may be desirably disposed along only a portion of and/or portions of such circumferences. FIGS. 17 and 18 illustrate additional exemplary embodiments of the probe cover 10 in which a substantially vertical extension 91 has been added to and/or defined by the camming surface 58. The embodiment of FIG. 17 does not include ribs 80, and is substantially structurally similar to the embodiment shown in FIG. 11, while the embodiment of FIG. 18 does include ribs 80 and is substantially structurally similar to the embodiment shown in FIG. 12. As described above, such ribs 80 may increase the structural rigidity of, for example, the flange 40.

As shown in FIG. 14, and as mentioned above, the ejector mechanism 25 may be utilized to remove the probe cover 10 from a medical instrument such as, for example, an IR thermometer or other like device. The ejector mechanism 25 may be a component of such an instrument, and in an exemplary embodiment, the probe cover 10 may be removed from the instrument by slidably engaging the cam follower surface 60 of the finger 35 with the camming surface 58 of the cover 10. The finger 35 may be manually actuated by the user of the instrument, and as shown in FIG. 14, one or more components of the ejector mechanism 25, such as the finger 35, may travel in a substantially arcuate path as it mates with the camming surface 58. Such an arcuate path is illustrated by arrow 90. The surface 60 may ride distally along substantially the entire camming surface 58 in removing the cover 10 from the instrument, and as the finger 35 is actuated in the direction of arrow 90, the flange 40 and/or other portions of the cover 10 may flex and/or otherwise bend about the weakened section of the flange 40. In an exemplary embodiment, such flexing may increase as the finger 35 is moved distally and/or in the direction of arrow 90. Flexing the cover 10 about the weakened section 88 in response to engagement between the surface 60 and the camming surface 58 may disengaged the cove 42 from the detent bead 38 of the instrument. It is also understood that as the cover 10 is flexed, at least a portion of the camming surface 58 may be moved in a direction toward the longitudinal axis 92 (FIGS. 11-13), and that as the cam follower surface 60 slidably engages the camming surface 58, the surface 60 may also move in a direction toward the longitudinal axis 92. In still further exemplary embodiments, in removing the cover 10 from the instrument, the finger 35 may be actuated distally along a path substantially away from the longitudinal axis 92. Such an exemplary path may be linear or arcuate, and in such exemplary embodiments as the cover 10 is flexed at the weakened portion, at least a portion of the camming surface 58 may be moved in a direction away from the longitudinal axis 92. In addition, as the cam follower surface 60 slidably engages the camming surface 58 in such embodiments, the surface 60 may also move in a direction away from the longitudinal axis 92.

Further, as illustrated in FIG. 14, as the weakened section 88 is bent by the application of force from the finger 35, at least a portion of the cove 42 may lift off of the detent bead 38. The actual point at which the cove 42 may disengaged from the detent bead 38 may vary depending on the shape, size, and/or other configurations of the various covers 42 and detent beads 38 described herein. It is understood that, however, moving at least a proximal portion of the cove 42 beyond a peak 39 of the detent bead 38 may disengaged the cove 42 therefrom. In exemplary embodiment, such a peak 39 may be defined by a radially outward-most point and/or section of the detent bead 38. For example, movement of the proximal portion of the cove 42 to the peak 39 and/or to a location distal to the peak 39 may disengaged the cove 42 from the detent bead 38.

Figure 16:
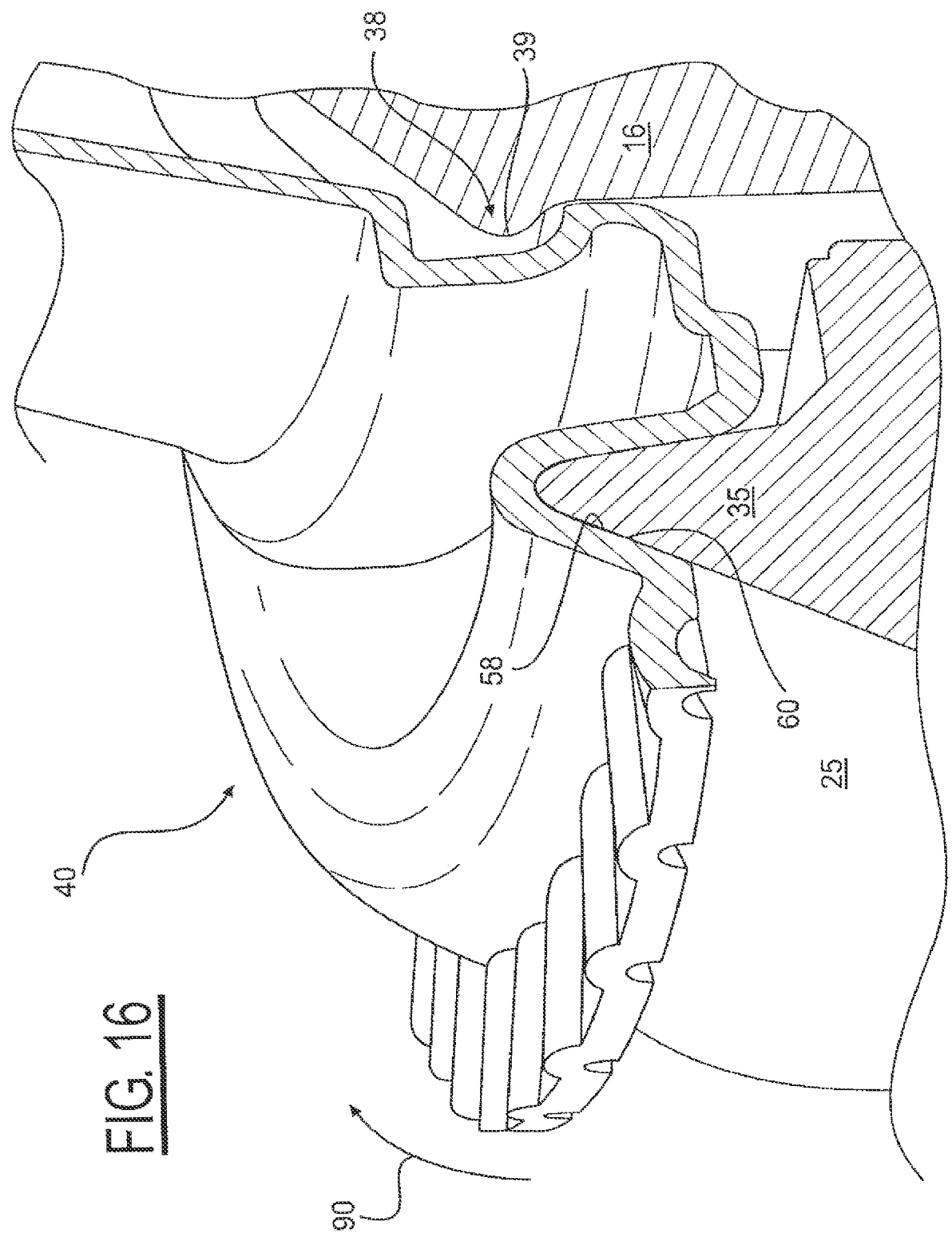
FIG. 16 is another exemplary embodiment of the probe cover and ejector mechanism show in FIG. 14.

As shown in FIG. 14, it is also understood that bending at least a portion of the flange 40 at the weakened section 88 may assist in separating at least a portion of the proximal end 84 of the probe cover 10 from the probe. In an exemplary embodiment, such separation may form and/or increase the size of a gap 94 between the inner surface 53 of the probe cover 10 and the distal end 16 of the probe. FIG. 16 illustrates an additional exemplary embodiment of the ejector mechanism 25 and probe cover shown in FIG. 14.

Figure 15:
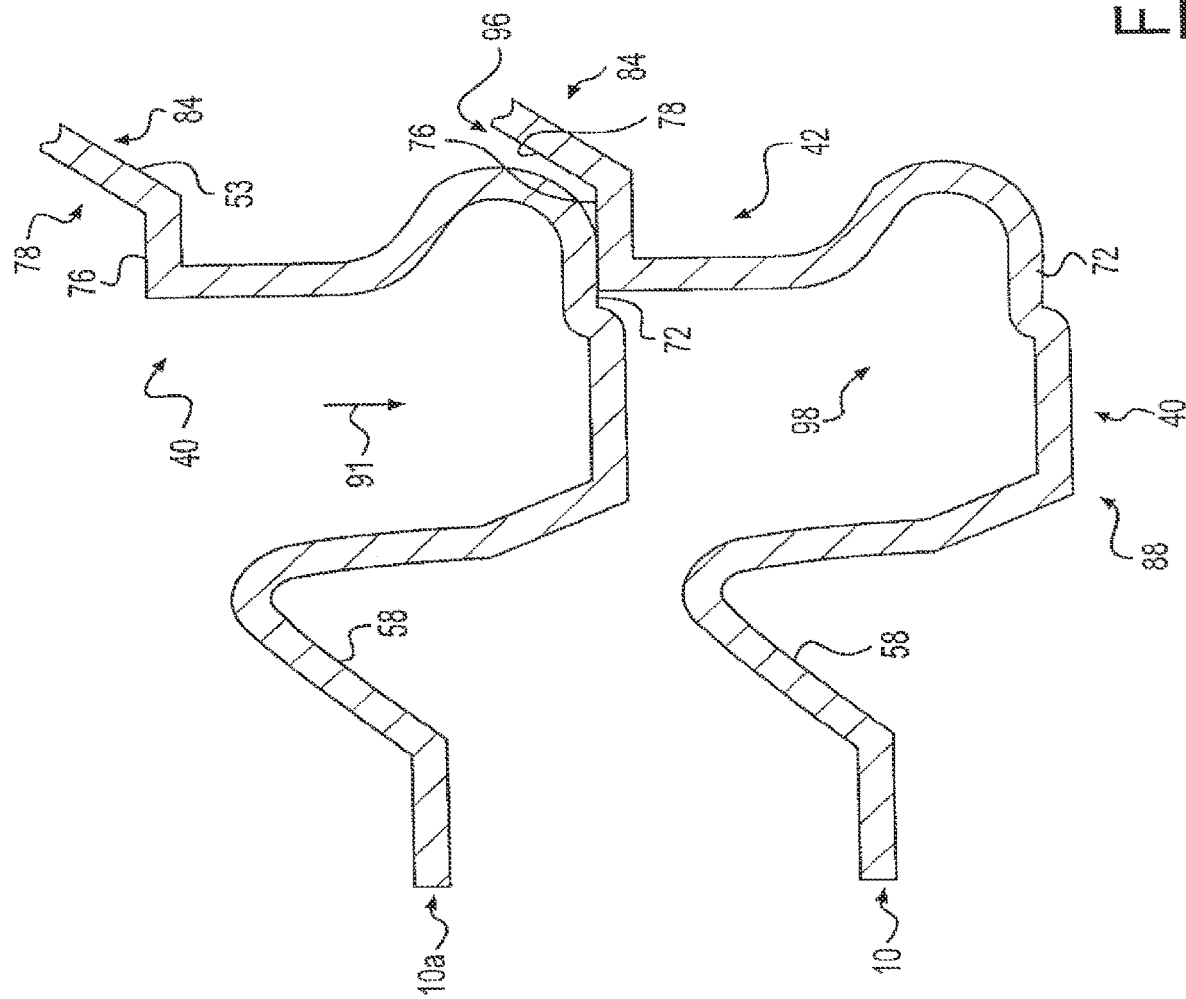
FIG. 15 is a partial cross-sectional view of a number of probe covers stacked on top of and substantially inside one another.

FIG. 15 illustrates a system for protecting an insertion probe of a medical device according to an exemplary embodiment of the present disclosure. In an exemplary embodiment, such a system may include one or more probe covers 10, 10a desirably stacked on top of each other. Such stacking may be convenient for storage and/or transportation of the probe covers 10, 10a.

In an exemplary embodiment, any of the probe covers 10 described herein may be stored and/or otherwise stacked as shown in FIG. 15, and one or more components of the probe covers 10 described herein may assist in preventing deformation and/or damage to the respective probe covers 10 while stacked. In addition, one or more of the components described herein may assist in preventing adjacent probe covers 10, 10a from binding and/or otherwise sticking together when stacked. It is understood that such sticking may be caused by, for example, the formation of a negative pressure environment between surfaces of adjacent probe covers 10, 10a. Such sticking and/or wedging may also be caused by, for example, repeatedly applying axial/longitudinal force on the stack of adjacent probe covers 10 during attachment to the probe.

In exemplary embodiments of the present disclosure, one or more of the ribs 80, base 72, shelf 76, and/or other components of each respective probe cover 10 may assist in preventing stacked probe covers from sticking together. For example, when stacked together, a second probe cover 10a may be disposed on top of a first probe cover 10 such that a distal end (not shown) of the first probe cover 10 is located substantially within a distal end (not shown) of the second probe cover 10a. When so situated, the proximal end 84 of the first probe cover 10 may be located substantially directly beneath and/or adjacent to the proximal end 84 of the second probe cover 10a. In an exemplary embodiment, one or more ribs 80 of the first probe cover 10 may mate with and/or otherwise engage one or more corresponding ribs 80 of the second probe cover 10a in such a stacked configuration. It is understood that engagement of such ribs 80 may assist in preventing two or more adjacent surfaces of the respective probe covers 10, 10a from sticking together while stacked.

In additional exemplary embodiments, the probe covers 10, 10a may be stacked such that the base 72 of the second probe cover 10a is disposed upon and/or otherwise mated with the shelf 76 of the first probe cover 10. In such an exemplary embodiment, the shelf 76 may act as a hard stop preventing the second probe cover 10a from moving further in the direction of arrow 91. Although the base 72 of the second probe cover 10a may be disposed at any location laterally along the shelf 76, it may be desirable to substantially align the longitudinal axis 92 of the second probe cover 10a with the longitudinal axis 92 of the first probe cover 10 so as to maximize the surface area of the base 72 engaged with the shelf 76. In exemplary embodiments, the base 72 and/or the shelf 76 of each probe cover 10, 10a may be sized to account for an acceptable degree of misalignment therebetween while stacked.

As described above, the shelf 76 may extend substantially annularly around the outer surface 78 of the probe cover 10 and/or the flange 40. Such a configuration may assist in supporting an adjacent probe cover 10a thereon regardless of the radial orientation of the second probe cover 10a. In additional exemplary embodiments, the base 72 may also extend substantially annularly around the flange 40 and/or the proximal end 84. In still further exemplary embodiments, one or both of the base 72 and the shelf 76 may define one or more channels, notches, spaces, breaks, and/or other structures to assist in preventing adjacent stacked probe covers 10, 10a from sticking together. As described above, such structures may prevent such sticking by allowing, for example, air and/or other fluids to pass therebetween.

When probe covers 10, 10a are stacked together as shown in FIG. 15, a gap 96 may be formed between the first probe cover 10 and the second probe cover 10a. Such a gap may be formed and/or otherwise maintained by engagement between, for example, the base 72 of the second probe cover 10a and the shelf 76 of the first probe cover 10. In an exemplary embodiment, the gap 96 may extend from the shelf 76 of the first probe cover 10 to the distal end 82 (not shown) of the first probe cover 10. It is understood that a gap 96 may be defined by and/or extend between two or more adjacent surfaces of the first and second probe covers 10, 10a. For example, the gap 96 may be defined by the outer surface 78 of the first probe cover 10 and the inner surface 53 of the second probe cover 10a. Maintaining such a gap 96 may assist in preventing the wedging, sticking, and/or binding problems discussed herein.

In additional exemplary embodiments in which one or more of the shelf 76 and/or the base 72 of adjacent stacked probe covers 10, 10a define one or more of the channels, spaces, breaks, and/or other structures described above, it is understood that the gap 96 may extend through such a structure along substantially the entire outer surface 78 of the first probe cover 10. Alternatively, in embodiments in which each of the base 72 and the shelf 76 extend substantially annularly without any such channels, a second gap 98 may be defined between the flange 40 of the first probe 10 and the flange 40 of the second probe 10a. Although the entirety of the stacked probe covers 10a are not illustrated in FIG. 15, it is understood that while the base 72 of the second probe cover 10a contacts the shelf 76 of the first probe cover 10, in an exemplary embodiment, a remainder of the second probe cover 10a may be separated from the first probe cover 10 due to the engagement between the base 72 and the shelf 76.

Figure 9A:
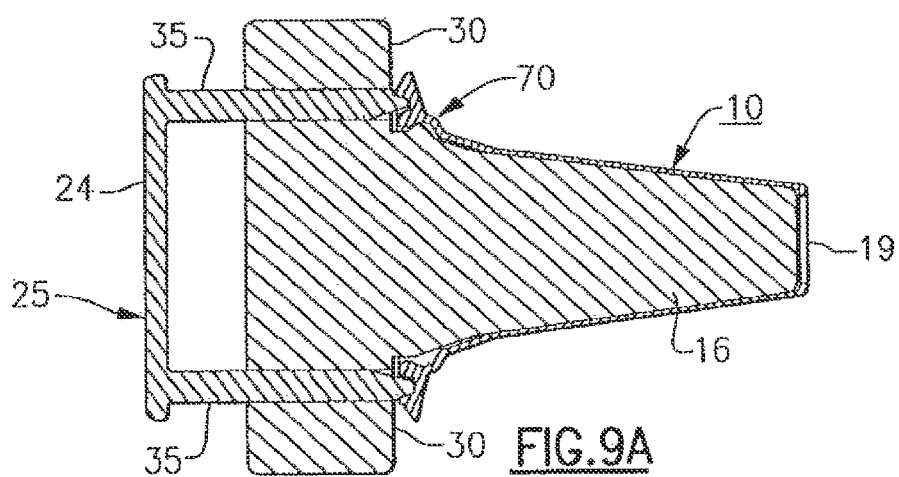
FIG. 9A is a partial view similar to that shown in FIG. 7A showing a further embodiment of the invention with one of the fastener in a locked position.
Figure 9B:
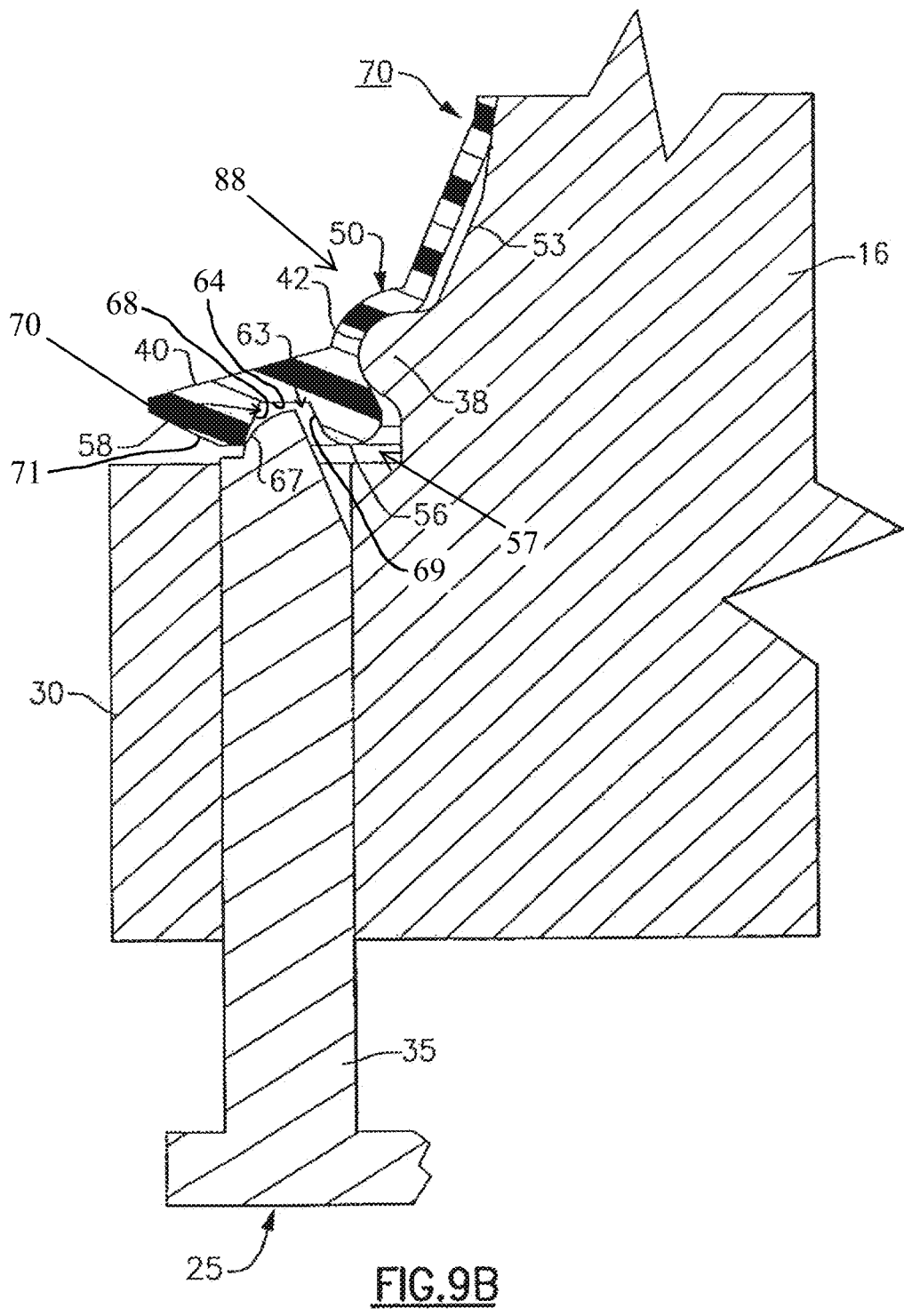
FIG. 9B is an enlarged view showing the snap-on fastener and the ejector mechanism shown in FIG. 9A in greater detail.

Turning now to FIGS. 9A and 9B, there is illustrated a further exemplary embodiment of the present disclosure. In this embodiment, the probe cover 10 is also equipped with a series of snap-on fittings 50 as described above. The cove 42 that is formed in the inner wall 53 of the cover body adjacent to the flange 40 is also provided with a weakened section 88 about which the flange 40 can flex. A circular groove 63 is provided in the outer face 56 of the flange 40, which contains a camming surface 58 that is angularly offset with regard to the longitudinal axis of the probe. As shown in at least FIG. 9B, an example circular groove 63 includes a substantially planar distal surface 64. Further, the example camming surface 58 includes a first sidewall 68, and the example flange 40 (e.g., the groove 63) includes a second sidewall 69 opposite the first sidewall 68. In such examples, the outer face 56 of the flange 40 may comprise a proximal base 57 of the flange 40. For example, the first and second sidewalls 68, 69 may extend proximally, from the distal surface 64, in the direction of the proximal base 57 of the flange 40 formed by the outer face 56. Further, as shown in at least FIG. 9B, an example flange 40 may include a radially outermost surface 70, and an edge surface 71 extending proximally and radially inwardly from the radially outermost surface 70. In such examples, the edge surface 71 circumferentially surrounds the camming surface 58. The end 67 of each ejector mechanism finger 35 is arcuate shaped and acts as a cam follower that rides in sliding contact with the camming surface 58. Again, as the ejector is moved from the first cover locking position to the second release position, each snap on fitting 50 is opened and the cover is released from the probe.

Figure 10:
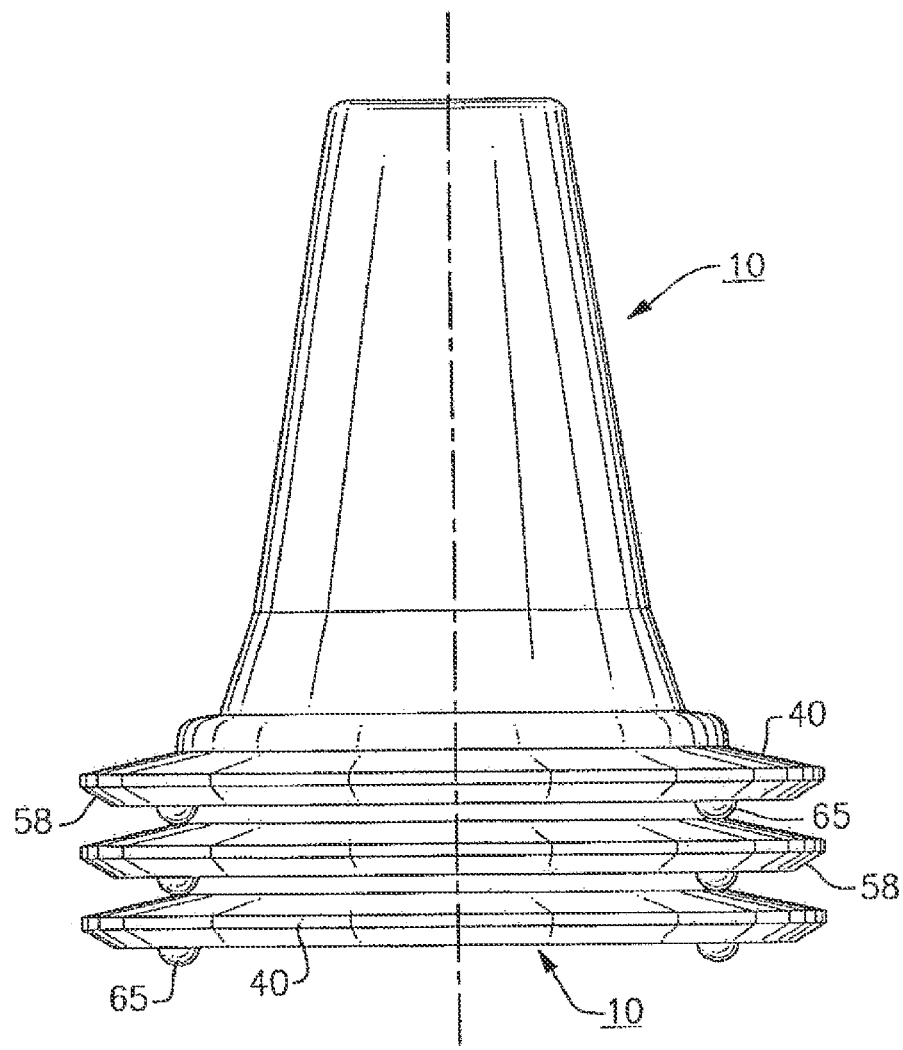
FIG. 10 is an enlarged view illustrating a number of protective covers stacked one inside the other.

As noted, it is the general practice to package and ship the covers in stacks. A number of probe covers 10-10 are illustrated in FIG. 10 in a stacked configuration. When stacked one on top of the other the semi circular tabs on the upper cover are arrange to seat upon the flange of the underlying cover to prevent the outer wall surface of the lower cover from moving into binding contact with the inner surface of the upper cover. In addition, the inclined edge surfaces 58 on the outer face of cover flange 40 provide an easily accessible space between each of the cover which can be utilized to further facilitate removal of individual covers from the stack.

While the invention has been described with reference to a preferred embodiment, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A probe cover, comprising:
 a distal end;
 a proximal end opposite the distal end;
 a wall forming an inner surface facing a central longitudinal axis of the probe cover;
 a cove formed by the inner surface, at least part of the cove extending radially away from the longitudinal axis; and
 a flange disposed at the proximal end, the flange including a first surface configured to receive a force from an ejector mechanism, and a proximally-facing outer face spaced from the first surface, wherein:
  a section of the wall is configured to flex in response to the force being applied to the first surface, and
  the proximally-facing outer face of the flange forms:
   a base of the probe cover at a proximal-most surface of the flange, and
   an edge surface, wherein from a radially outer-most surface of the flange, the edge surface extends:
    proximally away from the distal end of the probe cover, and
    radially inwardly.

2. The probe cover of claim 1, the section having a greater flexibility than a portion of the wall disposed adjacent and distal to the section.

3. The probe cover of claim 1, wherein the edge surface comprises a substantially linear surface disposed radially outward of the first surface, and at least part of the base is disposed radially inward of the first surface.

4. The probe cover of claim 1, wherein:
 the first surface comprises a first convex surface configured to receive the force, the first convex surface of the flange extending proximally in a direction toward the longitudinal axis, and
 the base is formed at least in part by a second convex surface.

5. The probe cover of claim 4, wherein the second convex surface comprises the proximal-most surface of the flange, the second convex surface being configured to mate with a corresponding opening of a medical instrument when the probe cover is releasably connected to the medical instrument.

6. The probe cover of claim 1, wherein the base extends substantially perpendicular to the longitudinal axis, and the first surface of the flange extends distally, from at least part of the base, in a direction toward the longitudinal axis.

7. The probe cover of claim 6, wherein the first surface extends distally, from the at least part of the base, to a distal peak, the distal peak extending substantially perpendicular to the longitudinal axis.

8. The probe cover of claim 7, wherein the flange comprises a second surface opposite and facing the first surface, the second surface extending proximally, from the distal peak, in a direction toward the longitudinal axis.

9. The probe cover of claim 1, wherein:
 the probe cover comprises a first probe cover,
 an outer surface of the first probe cover forms a shelf opposite the cove, and
 the shelf is configured to support a second probe cover thereon when the second probe cover is stacked on top of the first probe cover such that:
  the second probe cover is in contact with the shelf, and
  a longitudinal axis of the second probe cover is colinear with the longitudinal axis of the first probe cover.

10. The probe cover of claim 1, wherein the cove includes a rounded peak formed by the inner surface.

11. The probe cover of claim 1, wherein a proximal end of the first surface and a proximal end of the edge surface are disposed at an annular surface of the flange, the annular surface of the flange extending substantially perpendicular to the longitudinal axis.

12. The probe cover of claim 11, wherein the annular surface of the flange is disposed distal to the base of the probe cover.

13. The probe cover of claim 11, wherein the edge surface comprises a substantially linear surface disposed radially outward of the first surface, the edge surface extending distally and radially outwardly from the annular surface of the flange.

14. The probe cover of claim 13, wherein the first surface comprises a substantially linear surface extending distally and radially inwardly from the annular surface of the flange.

15. A probe cover, comprising:
 a distal end;
 a proximal end opposite the distal end;
 a wall extending proximally from the distal end of the probe cover, the wall including:
  an inner surface facing a central longitudinal axis of the probe cover, the inner surface forming an arcuate portion of the probe cover; and
 a flange disposed at the proximal end of the probe cover, the flange forming a base of the probe cover and a proximally-facing edge surface, wherein:
  the arcuate portion is disposed distal to the flange, and is configured to couple with a corresponding member of a medical instrument to releasably connect the probe cover to the medical instrument,
  a section of the wall is configured to flex when a force is applied to the flange by an ejector mechanism of the medical instrument in a first direction that is toward the distal end and substantially parallel to the longitudinal axis,
  flexing of the section decouples the arcuate portion and the corresponding member of the medical instrument, and from a radially outer-most surface of the flange, the edge surface extends:
   proximally away from the distal end of the probe cover, and
   radially inwardly.

16. The probe cover of claim 15, wherein the section comprises an annular weakened section of the probe cover disposed adjacent to the arcuate portion.

17. The probe cover of claim 15, wherein the wall forms a substantially frustoconical body of the probe cover.

18. The probe cover of claim 15, wherein the edge surface:
   comprises a substantially linear surface, and
   circumferentially surrounds an annular groove formed in an outer face of the flange.

19. The probe cover of claim 15, further comprising a plurality of convex tabs circumferentially spaced on a surface of the flange.

20. The probe cover of claim 15, the section having a greater flexibility than a portion of the wall disposed adjacent and distal to the section.

21. The probe cover of claim 15, wherein the arcuate portion comprises a substantially concave portion of the wall surrounding the longitudinal axis.

22. A method of manufacturing a probe cover, comprising:
   forming a distal end of the probe cover;
   forming a proximal end of the probe cover opposite the distal end;
   forming a continuous wall of the probe cover extending proximally from the distal end of the probe cover, the wall including an inner surface facing a central longitudinal axis of the probe cover;
   forming a cove with the inner surface, at least part of the cove extending radially away from the longitudinal axis; and
   forming a flange at the proximal end, the flange including a surface configured to receive a force from an ejector mechanism, and a proximally-facing outer face spaced from the first surface, wherein:
      a section of the wall is configured to flex in response to the force being applied to the first surface, and
      the proximally-facing outer face of the flange forms:
         a base of the probe cover at a proximal-most surface of the flange, and
         an edge surface, wherein from a radially outer-most surface of the flange, the edge surface extends:
            proximally away from the distal end of the probe cover, and
            radially inwardly.

23. The method of claim 22, wherein forming the probe cover comprises forming the probe cover from a polymer and via an injection molding process.

24. The method of claim 22, further comprising disposing an IR transparent lens at the distal end of the probe cover.

* * * * *